(12) United States Patent
Harley et al.

(10) Patent No.: US 8,638,320 B2
(45) Date of Patent: Jan. 28, 2014

(54) STYLUS ORIENTATION DETECTION

(75) Inventors: Jonah A. Harley, Mountain View, CA (US); Li-Quan Tan, Sunnyvale, CA (US); Debanjan Mukherjee, San Jose, CA (US); Steven Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 13/166,743

(22) Filed: Jun. 22, 2011

(65) Prior Publication Data

US 2012/0327042 A1 Dec. 27, 2012

(51) Int. Cl.
*G06F 3/033* (2013.01)

(52) U.S. Cl.
USPC ...... 345/179; 345/173; 178/18.06; 178/19.03

(58) Field of Classification Search
USPC ............. 345/173, 179, 158; 178/18.06, 19.03
See application file for complete search history.

(56) References Cited

U.S. PATENT DOCUMENTS

| | | | |
|---|---|---|---|
| 3,970,846 A | 7/1976 | Schofield et al. | |
| 4,220,815 A | 9/1980 | Gibson et al. | |
| 4,281,407 A * | 7/1981 | Tosima | 369/130 |
| 4,289,927 A | 9/1981 | Rodgers | |
| 4,320,292 A | 3/1982 | Oikawa et al. | |
| 4,334,219 A | 6/1982 | Paulus et al. | |
| 4,345,248 A | 8/1982 | Togashi et al. | |
| 4,405,921 A | 9/1983 | Mukaiyama | |
| 4,439,855 A * | 3/1984 | Dholakia | 369/126 |
| 4,476,463 A | 10/1984 | Ng et al. | |
| 4,481,510 A | 11/1984 | Hareng et al. | |
| 4,484,179 A | 11/1984 | Kasday | |
| 4,490,607 A | 12/1984 | Pease et al. | |
| 4,496,981 A | 1/1985 | Ota | |
| 4,520,357 A * | 5/1985 | Castleberry et al. | 345/85 |
| 4,542,375 A | 9/1985 | Alles et al. | |
| 4,577,057 A | 3/1986 | Blesser | |
| 4,602,321 A | 7/1986 | Bornhorst | |
| 4,603,356 A | 7/1986 | Bates | |
| 4,642,459 A | 2/1987 | Caswell et al. | |

(Continued)

FOREIGN PATENT DOCUMENTS

DE 036 02 796 A1 8/1987
DE 197 20 925 A1 12/1997

(Continued)

OTHER PUBLICATIONS

Final Office Action mailed Oct. 11, 2012, for U.S. Appl. No. 12/566,455, filed Sep. 24, 2009, eight pages.

(Continued)

*Primary Examiner* — Joe H Cheng
(74) *Attorney, Agent, or Firm* — Morrison & Foerster LLP

(57) ABSTRACT

Stylus orientation detection is disclosed. In an example, the orientation of a stylus relative to a contacting surface, e.g., a touch panel, can be detected by detecting a capacitance at one or more locations on the stylus relative to the surface, and then using the capacitance(s) to determine the orientation of the stylus relative to the surface. In another example, the orientation of a stylus relative to a contacting surface, e.g., a touch panel, can be detected by first detecting the orientation of the stylus relative to a reference, detecting the orientation of the contacting surface relative to the reference, and then calculating the orientation of the stylus relative to the contacting surface using the two detected orientations.

25 Claims, 18 Drawing Sheets

(56) References Cited

U.S. PATENT DOCUMENTS

| | | | |
|---|---|---|---|
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A * | 5/1992 | Blonder et al. ............... 345/173 |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,392,058 A * | 2/1995 | Tagawa ..................... 345/104 |
| 5,414,227 A | 5/1995 | Schubert et al. |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,751,453 A | 5/1998 | Baur |
| 5,757,522 A | 5/1998 | Kulick et al. |
| 5,767,623 A | 6/1998 | Friedman et al. |
| 5,777,713 A | 7/1998 | Kimura |
| 5,778,108 A | 7/1998 | Coleman, Jr. |
| 5,790,106 A * | 8/1998 | Hirano et al. ............... 345/173 |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,905,489 A * | 5/1999 | Takahama et al. ........... 345/174 |
| 5,917,464 A | 6/1999 | Stearns |
| 5,920,360 A | 7/1999 | Coleman, Jr. |
| 5,923,320 A * | 7/1999 | Murakami et al. ........... 345/179 |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,177 A | 5/2000 | Fujimoto |
| 6,067,062 A | 5/2000 | Takasu et al. |
| 6,067,140 A | 5/2000 | Woo et al. |
| 6,069,393 A | 5/2000 | Hatanaka et al. |
| 6,078,378 A | 6/2000 | Lu et al. |
| 6,087,599 A | 7/2000 | Knowles |
| 6,100,538 A | 8/2000 | Ogawa |
| 6,118,435 A | 9/2000 | Fujita et al. |
| 6,133,906 A | 10/2000 | Geaghan |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |

(56) References Cited

U.S. PATENT DOCUMENTS

| | | | |
|---|---|---|---|
| 6,188,781 B1 | 2/2001 | Brownlee | |
| 6,232,607 B1 | 5/2001 | Huang | |
| 6,236,053 B1 | 5/2001 | Shariv | |
| 6,236,063 B1 | 5/2001 | Yamazaki et al. | |
| 6,242,729 B1 | 6/2001 | Izumi et al. | |
| 6,262,408 B1 | 7/2001 | Izumi et al. | |
| 6,265,792 B1 | 7/2001 | Granchukoff | |
| 6,271,813 B1 | 8/2001 | Palalau | |
| 6,278,423 B1 | 8/2001 | Wald et al. | |
| 6,278,444 B1 | 8/2001 | Wilson et al. | |
| 6,284,558 B1 | 9/2001 | Sakamoto | |
| 6,295,113 B1 | 9/2001 | Yang | |
| 6,300,977 B1 | 10/2001 | Waechter et al. | |
| 6,310,610 B1 | 10/2001 | Beaton et al. | |
| 6,316,790 B1 | 11/2001 | Kodaira et al. | |
| 6,320,617 B1 | 11/2001 | Gee et al. | |
| 6,323,490 B1 | 11/2001 | Ikeda et al. | |
| 6,323,846 B1 | 11/2001 | Westerman et al. | |
| 6,326,956 B1 | 12/2001 | Jaeger et al. | |
| 6,327,376 B1 | 12/2001 | Harkin | |
| 6,351,076 B1 | 2/2002 | Yoshida et al. | |
| 6,351,260 B1 | 2/2002 | Graham et al. | |
| 6,357,939 B1 | 3/2002 | Baron | |
| 6,364,829 B1 | 4/2002 | Fulghum | |
| 6,377,249 B1 | 4/2002 | Mumford | |
| 6,380,995 B1 | 4/2002 | Kim | |
| 6,392,254 B1 | 5/2002 | Liu et al. | |
| 6,399,166 B1 | 6/2002 | Khan et al. | |
| 6,400,359 B1* | 6/2002 | Katabami | 345/173 |
| 6,441,362 B1 | 8/2002 | Ogawa | |
| 6,453,008 B1 | 9/2002 | Sakaguchi et al. | |
| 6,465,824 B1 | 10/2002 | Kwasnick et al. | |
| 6,476,447 B1 | 11/2002 | Yamazaki et al. | |
| 6,489,631 B2 | 12/2002 | Young et al. | |
| 6,495,387 B2 | 12/2002 | French | |
| 6,504,530 B1 | 1/2003 | Wilson et al. | |
| 6,518,561 B1 | 2/2003 | Miura | |
| 6,521,109 B1 | 2/2003 | Bartic et al. | |
| 6,529,189 B1 | 3/2003 | Colgan et al. | |
| 6,552,745 B1 | 4/2003 | Perner | |
| 6,597,348 B1 | 7/2003 | Yamazaki et al. | |
| 6,603,867 B1 | 8/2003 | Sugino et al. | |
| 6,646,636 B1 | 11/2003 | Popovich et al. | |
| 6,667,740 B2 | 12/2003 | Ely et al. | |
| 6,679,702 B1 | 1/2004 | Rau | |
| 6,681,034 B1 | 1/2004 | Russo | |
| 6,690,387 B2 | 2/2004 | Zimmerman et al. | |
| 6,738,031 B2 | 5/2004 | Young et al. | |
| 6,738,050 B2* | 5/2004 | Comiskey et al. | 345/173 |
| 6,741,655 B1 | 5/2004 | Chang et al. | |
| 6,762,741 B2 | 7/2004 | Weindorf | |
| 6,803,906 B1 | 10/2004 | Morrison et al. | |
| 6,815,716 B2 | 11/2004 | Sanson et al. | |
| 6,831,710 B2 | 12/2004 | den Boer | |
| 6,862,022 B2 | 3/2005 | Slupe | |
| 6,864,882 B2 | 3/2005 | Newton | |
| 6,879,344 B1 | 4/2005 | Nakamura et al. | |
| 6,879,710 B1 | 4/2005 | Hinoue et al. | |
| 6,888,528 B2 | 5/2005 | Rai et al. | |
| 6,947,017 B1 | 9/2005 | Gettemy | |
| 6,947,102 B2 | 9/2005 | den Boer et al. | |
| 6,972,753 B1 | 12/2005 | Kimura et al. | |
| 6,995,743 B2 | 2/2006 | Boer et al. | |
| 7,006,080 B2 | 2/2006 | Gettemy | |
| 7,009,663 B2 | 3/2006 | Abileah et al. | |
| 7,015,894 B2 | 3/2006 | Morohoshi | |
| 7,023,503 B2 | 4/2006 | den Boer | |
| 7,053,967 B2 | 5/2006 | Abileah et al. | |
| 7,068,254 B2 | 6/2006 | Yamazaki et al. | |
| 7,098,894 B2 | 8/2006 | Yang et al. | |
| 7,109,465 B2 | 9/2006 | Kok et al. | |
| 7,157,649 B2 | 1/2007 | Hill | |
| 7,164,164 B2 | 1/2007 | Nakamura et al. | |
| 7,176,905 B2 | 2/2007 | Baharav et al. | |
| 7,177,026 B2 | 2/2007 | Perlin | |
| 7,184,009 B2 | 2/2007 | Bergquist | |
| 7,184,064 B2 | 2/2007 | Zimmerman et al. | |
| 7,190,461 B2 | 3/2007 | Han et al. | |
| 7,205,988 B2 | 4/2007 | Nakamura et al. | |
| 7,208,102 B2 | 4/2007 | Aoki et al. | |
| 7,242,049 B2 | 7/2007 | Forbes et al. | |
| 7,250,596 B2 | 7/2007 | Reime | |
| 7,298,367 B2 | 11/2007 | Geaghan et al. | |
| 7,348,946 B2 | 3/2008 | Booth, Jr. et al. | |
| 7,372,455 B2* | 5/2008 | Perski et al. | 345/173 |
| 7,408,598 B2 | 8/2008 | den Boer et al. | |
| 7,418,117 B2 | 8/2008 | Kim et al. | |
| 7,450,105 B2 | 11/2008 | Nakamura et al. | |
| 7,456,812 B2 | 11/2008 | Smith et al. | |
| 7,463,297 B2 | 12/2008 | Yoshida et al. | |
| 7,483,005 B2 | 1/2009 | Nakamura et al. | |
| 7,522,149 B2 | 4/2009 | Nakamura et al. | |
| 7,535,468 B2 | 5/2009 | Uy | |
| 7,536,557 B2 | 5/2009 | Murakami et al. | |
| 7,545,371 B2 | 6/2009 | Nakamura et al. | |
| 7,598,949 B2 | 10/2009 | Han | |
| 7,612,767 B1 | 11/2009 | Griffin et al. | |
| 7,629,945 B2 | 12/2009 | Baudisch | |
| 7,649,527 B2 | 1/2010 | Cho et al. | |
| 7,663,607 B2 | 2/2010 | Hotelling et al. | |
| 7,859,519 B2 | 12/2010 | Tulbert | |
| 7,924,272 B2 | 4/2011 | Boer et al. | |
| 8,094,128 B2* | 1/2012 | Vu et al. | 345/173 |
| 8,169,421 B2* | 5/2012 | Wright et al. | 345/179 |
| 8,479,122 B2 | 7/2013 | Hotelling et al. | |
| 2001/0000676 A1 | 5/2001 | Zhang et al. | |
| 2001/0003711 A1 | 6/2001 | Coyer | |
| 2001/0044858 A1 | 11/2001 | Rekimoto | |
| 2001/0046013 A1 | 11/2001 | Noritake et al. | |
| 2001/0052597 A1 | 12/2001 | Young et al. | |
| 2001/0055008 A1 | 12/2001 | Young et al. | |
| 2002/0027164 A1 | 3/2002 | Mault et al. | |
| 2002/0030581 A1 | 3/2002 | Janiak et al. | |
| 2002/0030768 A1 | 3/2002 | Wu | |
| 2002/0052192 A1 | 5/2002 | Yamazaki et al. | |
| 2002/0063518 A1 | 5/2002 | Okamoto et al. | |
| 2002/0067845 A1 | 6/2002 | Griffis | |
| 2002/0071074 A1 | 6/2002 | Noritake et al. | |
| 2002/0074549 A1 | 6/2002 | Park et al. | |
| 2002/0080123 A1 | 6/2002 | Kennedy et al. | |
| 2002/0080263 A1 | 6/2002 | Krymski | |
| 2002/0126240 A1 | 9/2002 | Seiki et al. | |
| 2002/0149571 A1 | 10/2002 | Roberts | |
| 2002/0175903 A1 | 11/2002 | Fahraeus et al. | |
| 2003/0038778 A1 | 2/2003 | Noguera | |
| 2003/0103030 A1 | 6/2003 | Wu | |
| 2003/0117369 A1 | 6/2003 | Spitzer et al. | |
| 2003/0137494 A1 | 7/2003 | Tulbert | |
| 2003/0151569 A1 | 8/2003 | Lee et al. | |
| 2003/0156087 A1 | 8/2003 | Boer et al. | |
| 2003/0156100 A1 | 8/2003 | Gettemy | |
| 2003/0156230 A1 | 8/2003 | Boer et al. | |
| 2003/0174256 A1 | 9/2003 | Kim et al. | |
| 2003/0174870 A1 | 9/2003 | Kim et al. | |
| 2003/0179323 A1 | 9/2003 | Abileah et al. | |
| 2003/0183019 A1 | 10/2003 | Chae | |
| 2003/0197691 A1* | 10/2003 | Fujiwara et al. | 345/179 |
| 2003/0205662 A1 | 11/2003 | Boer | |
| 2003/0218116 A1 | 11/2003 | Boer | |
| 2003/0231277 A1 | 12/2003 | Zhang | |
| 2003/0234759 A1 | 12/2003 | Bergquist | |
| 2004/0008189 A1 | 1/2004 | Clapper et al. | |
| 2004/0046900 A1 | 3/2004 | Boer et al. | |
| 2004/0095333 A1 | 5/2004 | Morag et al. | |
| 2004/0113877 A1 | 6/2004 | Abileah et al. | |
| 2004/0125430 A1 | 7/2004 | Kasajima et al. | |
| 2004/0140962 A1 | 7/2004 | Wang et al. | |
| 2004/0189587 A1 | 9/2004 | Jung et al. | |
| 2004/0191976 A1 | 9/2004 | Udupa et al. | |
| 2004/0252867 A1 | 12/2004 | Lan et al. | |
| 2005/0007125 A1 | 1/2005 | Heger | |
| 2005/0040393 A1 | 2/2005 | Hong | |
| 2005/0091297 A1 | 4/2005 | Sato et al. | |
| 2005/0110777 A1 | 5/2005 | Geaghan et al. | |

(56) References Cited

U.S. PATENT DOCUMENTS

| | | |
|---|---|---|
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0285985 A1 | 12/2005 | Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0026521 A1 | 2/2006 | Hotelling et al. |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0030258 A1 | 2/2007 | Pittel et al. |
| 2007/0109239 A1 | 5/2007 | den Boer et al. |
| 2007/0109286 A1 | 5/2007 | Nakamura et al. |
| 2007/0131991 A1 | 6/2007 | Sugawa |
| 2007/0216905 A1 | 9/2007 | Han et al. |
| 2007/0279346 A1 | 12/2007 | den Boer et al. |
| 2007/0285405 A1 | 12/2007 | Rehm |
| 2008/0029691 A1 | 2/2008 | Han |
| 2008/0030461 A1 | 2/2008 | Matsui et al. |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | Abileah et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | de Boer et al. |
| 2008/0158172 A1 | 7/2008 | Hotelling et al. |
| 2008/0165311 A1 | 7/2008 | Abileah et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0309625 A1 | 12/2008 | Krah et al. |
| 2009/0065269 A1* | 3/2009 | Katsurahira ............... 178/19.06 |
| 2009/0128529 A1 | 5/2009 | Izumi et al. |
| 2009/0135492 A1 | 5/2009 | Kusuda et al. |
| 2009/0167702 A1 | 7/2009 | Nurmi |
| 2009/0167728 A1 | 7/2009 | Geaghan et al. |
| 2009/0225210 A1 | 9/2009 | Sugawa |
| 2009/0262637 A1 | 10/2009 | Badaye et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0045904 A1 | 2/2010 | Katoh et al. |
| 2010/0051356 A1 | 3/2010 | Stern et al. |
| 2010/0053113 A1 | 3/2010 | Wu et al. |
| 2010/0059296 A9 | 3/2010 | Abileah et al. |
| 2010/0066693 A1* | 3/2010 | Sato et al. ..................... 345/173 |
| 2010/0073323 A1* | 3/2010 | Geaghan ..................... 345/174 |
| 2010/0118237 A1 | 5/2010 | Katoh et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0315384 A1 | 12/2010 | Hargreaves et al. |
| 2010/0315394 A1 | 12/2010 | Katoh et al. |
| 2011/0001708 A1* | 1/2011 | Sleeman ..................... 345/173 |
| 2011/0043489 A1 | 2/2011 | Yoshimoto |
| 2011/0169771 A1 | 7/2011 | Fujioka et al. |
| 2011/0175834 A1* | 7/2011 | Han et al. ..................... 345/173 |
| 2011/0304592 A1 | 12/2011 | Booth et al. |
| 2012/0019488 A1 | 1/2012 | McCarthy |
| 2012/0050207 A1* | 3/2012 | Westhues et al. ............ 345/174 |
| 2012/0062497 A1* | 3/2012 | Rebeschi et al. ............ 345/174 |
| 2012/0146958 A1* | 6/2012 | Oda et al. ..................... 345/179 |
| 2012/0154340 A1* | 6/2012 | Vuppu et al. ................. 345/179 |
| 2012/0327040 A1 | 12/2012 | Simon |
| 2012/0327041 A1 | 12/2012 | Harley |
| 2012/0331546 A1 | 12/2012 | Falkenburg |

FOREIGN PATENT DOCUMENTS

| | | |
|---|---|---|
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 2 221 659 A1 | 8/2010 |
| JP | 55-074635 A | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 7/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| WO | WO-97/40488 A1 | 10/1997 |

(56) References Cited

FOREIGN PATENT DOCUMENTS

| WO | WO-99/21160 A1 | 4/1999 |
|---|---|---|
| WO | WO-99/22338 A1 | 5/1999 |
| WO | WO-01/45283 A1 | 6/2001 |
| WO | WO 2006/104214 A1 | 10/2006 |
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2012/177567 A1 | 12/2012 |
| WO | WO-2012/177571 A1 | 12/2012 |
| WO | WO-2012/177573 A2 | 12/2012 |
| WO | WO-2012/177569 A2 | 3/2013 |
| WO | WO-2012/177569 A3 | 3/2013 |

OTHER PUBLICATIONS

Final Office Action mailed Oct. 25, 2012, for U.S. Appl. No. 12/568,302, filed Sep. 28, 2009, 14 pages.
Final Office Action mailed Oct. 25, 2012, for U.S. Appl. No. 12/568,316, filed Sep. 28, 2009, 16 pages.
Non-Final Office Action mailed Nov. 15, 2012, for U.S. Appl. No. 12/566,477, filed Sep. 24, 2009, 12 pages.
International Search Report mailed Jan. 16, 2013, for PCT Application No. PCT/US2012/043021, filed Jun. 18, 2012, six pages.
Non-Final Office Action mailed Nov. 17, 2011, for U.S. Appl. No. 11/977,339, filed Oct. 24, 2007, six pages.
Non-Final Office Action mailed Jan. 10, 2012, for U.S. Appl. No. 11/977,864, filed Oct. 26, 2007, nine pages.
Notification of Reasons for Rejection mailed Dec. 19, 2011, for JP Patent Application No. 2008-540205, with English Translation, six pages.
Non-Final Office Action mailed Jan. 31, 2012, for U.S. Appl. No. 12/566,477, filed Sep. 24, 2009, 11 pages.
Non-Final Office Action mailed Feb. 29, 2012, for U.S. Appl. No. 11/978,031, filed Oct. 25, 2007, 20 pages.
Abileah, A. et al. (2004). "59.3: Integrated Optical Touch Panel in a 14.1' AMLCD," *SID '04 Digest* (Seattle) pp. 1544-1547.
Non-Final Office Action mailed Jun. 4, 2004, for U.S. Appl. No. 10/217,798, filed Aug. 12, 2002, 17 pages.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed May 18, 2011, for U.S. Appl. No. 11/978,031, filed Oct. 25, 2007, 17 pages.
Non-Final Office Action mailed Apr. 29, 2011, for U.S. Appl. No. 11/977,911, 19 pages.
Abileah, A. et al. (2006). "9.3: Optical Sensors Embedded within AMLCD Panel: Design and Applications," *ADEAC '06, SID* (Atlanta) pp. 102-105.
Abileah, A. et al. (2007). "Optical Sensors Embedded within AMLCD Panel: Design and Applications," *Siggraph-07*, San Diego, 5 pages.
Bobrov, Y. et al. (2002). "5.2 Manufacturing of a Thin-Film LCD," *Optiva, Inc.*, San Francisco, CA. 4 pages.
Brown, C. et al. (2007). "7.2: A 2.6 inch VGA LCD with Optical Input Function using a 1-Transistor Active-Pixel Sensor," *ISSCC* 2007 pp. 132-133, 592.
Den Boer, W. et al. (2003). "56.3: Active Matrix LCD with Integrated Optical Touch Screen," *SID '03 Digest* (Baltimore) pp. 1-4.
Echtler, F. et al. (Jan. 2010). "An LED-based Multitouch Sensor for LCD Screens," Cambridge, MA *ACM* 4 pages.
Final Office Action mailed Mar. 4, 2004, for U.S. Appl. No. 10/217,798, filed Aug. 12, 2002, 17 pages.

Final Office Action mailed Jan. 21, 2005, for U.S. Appl. No. 10/329,217, filed Dec. 23, 2002, 13 pages.
Final Office Action mailed Aug. 9, 2005, for U.S. Appl. No. 10/442,433, filed May 20, 2003, 13 pages.
Final Office Action mailed Aug. 23, 2005, for U.S. Appl. No. 10/217,798, filed Aug. 12, 2002, 10 pages.
Final Office Action mailed Dec. 13, 2005, for U.S. Appl. No. 10/371,413, filed Feb. 20, 2003, seven pages.
Final Office Action mailed May 23, 2007, for U.S. Appl. No. 11/137,753, filed May 25, 2005, 12 pages.
Final Office Action mailed Oct. 18, 2007, for U.S. Appl. No. 11/351,098, filed Feb. 8, 2006, six pages.
Final Office Action mailed Oct. 31, 2007, for U.S. Appl. No. 10/217,798, filed Aug. 12, 2002, 10 pages.
Final Office Action mailed Mar. 24, 2009, for U.S. Appl. No. 11/351,098, filed Feb. 8, 2006, 11 pages.
Final Office Action mailed Feb. 10, 2011, for U.S. Appl. No. 11/901,649, filed Sep. 18, 2007, 20 pages.
Hong, S.J. et al. (2005). "Smart LCD Using a-Si Photo Sensor," *IMID '05 Digest* pp. 280-283.
International Preliminary Report on Patentability and Written Opinion mailed Oct. 8, 2004, for PCT Application No. PCT/US03/05300, filed Feb. 20, 2003, 15 pages.
International Preliminary Report on Patentability and Written Opinion mailed Dec. 30, 2004, for PCT Application No. PCT/US02/25573, filed Aug. 12, 2002, 16 pages.
International Preliminary Report on Patentability and Written Opinion mailed May 14, 2008, for PCT Application No. PCT/US06/43741, filed Nov. 10, 2006, four pages.
International Search Report mailed Apr. 14, 2003, for PCT Application No. PCT/US02/25573, filed Aug. 12, 2002 two pages.
International Search Report mailed Jun. 16, 2003, for PCT Application No. PCT/US03/05300, filed Feb. 20, 2003, two pages.
International Search Report mailed Nov. 11, 2003, for PCT Application No. PCT/US03/03277, filed Feb. 4, 2003, three pages.
International Search Report mailed Sep. 21, 2007, for PCT Application No. PCT/US06/43741, filed Nov. 10, 2006, one page.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmány Catholic University, Budapest, Hungary 122 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed May 21, 2004, for U.S. Appl. No. 10/329,217, filed Dec. 23, 2002, 14 pages.
Non-Final Office Action mailed Sep. 21, 2004, for U.S. Appl. No. 10/442,433, filed May 20, 2003, seven pages.
Non-Final Office Action mailed Nov. 26, 2004, for U.S. Appl. No. 10/307,106, filed Nov. 27, 2002, nine pages.
Non-Final Office Action mailed Dec. 10, 2004, for U.S. Appl. No. 10/217,798, filed Aug. 12, 2002, 10 pages.
Non-Final Office Action mailed Jan. 21, 2005, for U.S. Appl. No. 10/347,149, filed Jan. 17, 2003, 10 pages.
Non-Final Office Action mailed Apr. 15, 2005, for U.S. Appl. No. 10/371,413, Filed Feb. 20, 2003, five pages.
Non-Final Office Action mailed Jun. 22, 2005, for U.S. Appl. No. 10/739,455, filed Dec. 17, 2003, 11 pages.
Non-Final Office Action mailed Jul. 12, 2005, for U.S. Appl. No. 10/347,149, filed Jan. 17, 2003, four pages.
Non-Final Office Action mailed Jan. 13, 2006, for U.S. Appl. No. 10/217,798, filed Aug. 12, 2002, nine pages.
Non-Final Office Action mailed May 12, 2006, for U.S. Appl. No. 10/217,798, filed Aug. 12, 2002, eight pages.
Non-Final Office Action mailed Aug. 28, 2006, for U.S. Appl. No. 10/371,413, filed Feb. 20, 2003, seven pages.
Non-Final Office Action mailed Jun. 28, 2007, for U.S. Appl. No. 11/351,098, filed Feb. 8, 2006, 13 pages.
Non-Final Office Action mailed Jun. 29, 2007, for U.S. Appl. No. 10/217,798, filed Aug. 12, 2002, 11 pages.
Non-Final Office Action mailed Feb. 25, 2008, for U.S. Appl. No. 11/137,753, filed May 25, 2005, 16 pages.

(56) References Cited

OTHER PUBLICATIONS

Non-Final Office Action mailed Jun. 24, 2008, for U.S. Appl. No. 11/351,098, filed Feb. 8, 2006, 12 pages.
Non-Final Office Action mailed Jun. 25, 2009, for U.S. Appl. No. 11/980,029, filed Oct. 29, 2007, 10 pages.
Non-Final Office Action mailed Nov. 23, 2009, for U.S. Appl. No. 11/407,545, filed Apr. 19, 2006, six pages.
Non-Final Office Action mailed Jul. 29, 2010, for U.S. Appl. No. 11/901,649, filed Sep. 18, 2007, 22 pages.
Non-Final Office Action mailed Oct. 13, 2010, for U.S. Appl. No. 11/978,006, filed Oct. 25, 2007, nine pages.
Non-Final Office Action mailed Oct. 14, 2010, for U.S. Appl. No. 11/595,071, filed Nov. 8, 2006, eight pages.
Non-Final Office Action mailed Nov. 26, 2010, for U.S. Appl. No. 11/977,279, filed Oct. 24, 2007, 10 pages.
Non-Final Office Action mailed Nov. 26, 2010, for U.S. Appl. No. 11/977,830, filed Oct. 26, 2007, eight pages.
Non-Final Office Action mailed Dec. 13, 2010, for U.S. Appl. No. 11/977,339, filed Oct. 24, 2007, nine pages.
Non-Final Office Action mailed Feb. 1, 2011, for U.S. Appl. No. 11/978,031, filed Oct. 25, 2007, 20 pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Sachs, E. et al. (Nov. 1991). "3-Draw: A Tool for Designing 3D Shapes," *IEEE Computer Graphics & Applications* pp. 18-26.
Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.

Final Office Action mailed Jun. 15, 2011, for U.S. Appl. No. 11/595,071, filed Nov. 8, 2006, 9 pages.
Final Office Action mailed Jun. 24, 2011, for U.S. Appl. No. 11/978,006, filed Oct. 25, 2007, 12 pages.
Final Office Action mailed Jul. 5, 2011, for U.S. Appl. No. 11/977,279, filed Oct. 24, 2007, 12 pages.
Non-Final Office Action mailed Jun. 21, 2011, for U.S. Appl. No. 11/977,339, filed Oct. 24, 2007, 11 pages.
Non-Final Office Action mailed Jun. 28, 2011, for U.S. Appl. No. 12/852,883, filed Aug. 8, 2010, 16 pages.
International Search Report mailed Oct. 17, 2012, for PCT Application No. PCT/US2012/043019, filed Jun. 18, 2012, five pages.
International Search Report mailed Oct. 17, 2012, for PCT Application No. PCT/US2012/043023, filed Jun. 18, 2012, six pages.
Non-Final Office Action mailed Apr. 20, 2012, for U.S. Appl. No. 12/566,455, filed Sep. 24, 2009, nine pages.
Non-Final Office Action mailed Jun. 5, 2012, for U.S. Appl. No. 11/595,071, filed Nov. 8, 2006, 15 pages.
Non-Final Office Action mailed Jun. 19, 2012, for U.S. Appl. No. 11/977,864, filed Oct. 26, 2007, eight pages.
Final Office Action mailed Sep. 29, 2011, for U.S. Appl. No. 11/977,911, filed Oct. 26, 2007, 22 pages.
Non-Final Office Action mailed Nov. 2, 2011, for U.S. Appl. No. 12/568,316, filed Sep. 28, 2009, 31 pages.
Non-Final Office Action mailed Nov. 4, 2011, for U.S. Appl. No. 12/568,302, filed Sep. 28, 2009, 29 pages.
International Search Report mailed Feb. 18, 2013, for PCT Application No. PCT/US2012/043025, filed Jun. 18, 2012, six pages.
Final Office Action mailed Jul. 26, 2013, for U.S. Appl. No. 13/166,726, filed Jun. 22, 2011, 10 pages.
Non-Final Office Action mailed Mar. 5, 2013, for U.S. Appl. No. 13/166,726, filed Jun. 22, 2011, 14 pages.
Non-Final Office Action mailed Mar. 29, 2013, for U.S. Appl. No. 13/166,699, filed Jun. 22, 2011, 17 pages.
Non-Final Office Action mailed Jun. 17, 2013, for U.S. Appl. No. 13/166,711, filed Jun. 22, 2011, eight pages.
U.S. Appl. No. 60/359,263, filed Feb. 20, 2002, by den Boer et al.
U.S. Appl. No. 60/383,040, filed May 23, 2002, by Abileah et al.
U.S. Appl. No. 60/736,708, filed Nov. 14, 2005, by den Boer et al.
U.S. Appl. No. 60/821,325, filed Aug. 3, 2006, by Abileah et al.

* cited by examiner

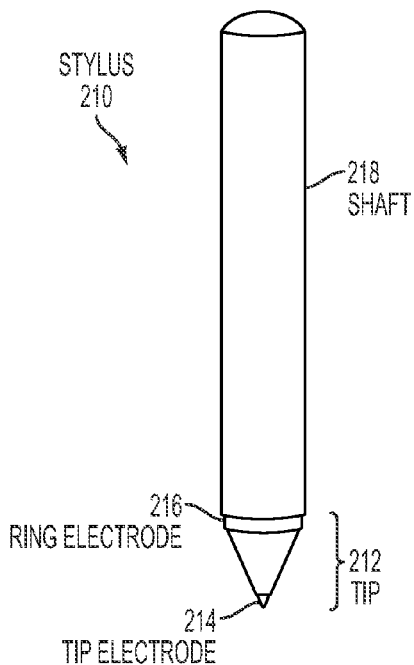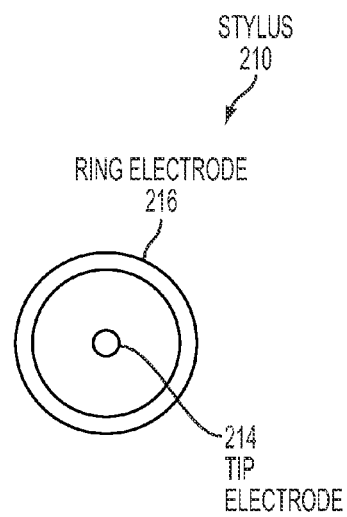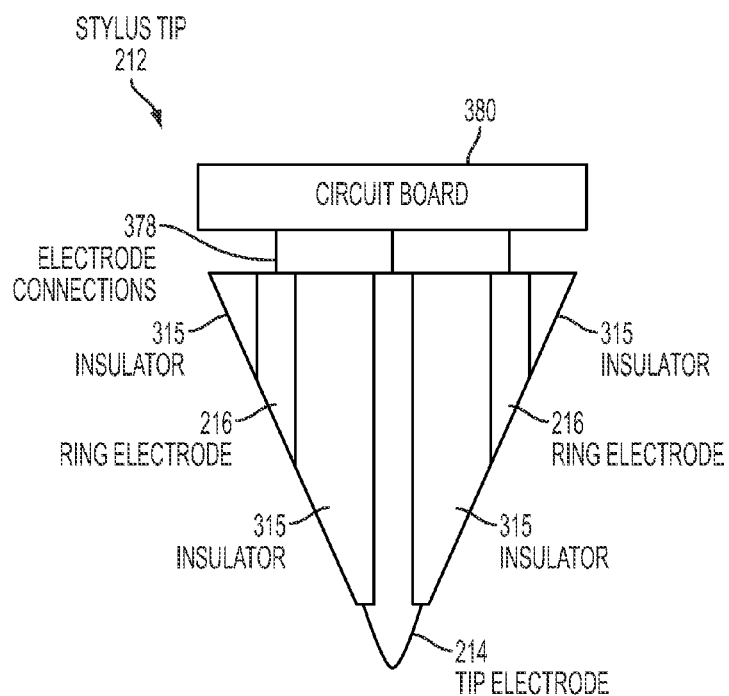

STYLUS ORIENTATION DETECTION

FIELD

This relates generally to touch sensing and more particularly, to providing a stylus for use with a touch sensitive device and detecting an orientation of the stylus relative to the device.

BACKGROUND

Many types of input devices are available for performing operations in a computing system, such as buttons or keys, mice, trackballs, touch sensor panels, joysticks, touch pads, touch screens, and the like. Touch sensitive devices, and touch screens, in particular, are becoming increasingly popular because of their ease and versatility of operation as well as their declining price. Touch sensitive devices can include a touch sensor panel, which can be a clear panel with a touch sensitive surface, and a display device such as a liquid crystal display (LCD) that can be positioned partially or fully behind the panel, or integrated with the panel, so that the touch sensitive surface can substantially cover the viewable area of the display device. Touch sensitive devices can generally allow a user to perform various functions by touching or hovering over the touch sensor panel using one or more fingers, a stylus or other object at a location often dictated by a user interface (UI) including virtual buttons, keys, bars, displays, and other elements, being displayed by the display device. In general, touch screens can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

When a stylus has been used as an input device, the stylus has traditionally provided simply a touch input without additional information that can be helpful to the touch sensitive device for detecting touch or hover events.

SUMMARY

This relates to detection of an orientation of a stylus relative to a surface. In an example, the orientation of a stylus relative to a contacting surface, e.g., a touch panel, can be detected by detecting a capacitance at one or more locations on the stylus relative to the surface, and then using the capacitance(s) to determine the orientation of the stylus relative to the surface. In another example, the orientation of a stylus relative to a contacting surface, e.g., a touch panel, can be detected by first detecting the orientation of the stylus relative to a reference, detecting the orientation of the contacting surface relative to the reference, and then calculating the orientation of the stylus relative to the contacting surface using the two detected orientations. Stylus orientation can advantageously be used to affect width and darkness of a resultant line displayed on the touch panel, thereby improving the realism of the stylus experience. The stylus can advantageously be used to improve touch and hover sensing and to preserve power savings in the contacting device.

BRIEF DESCRIPTION OF THE DRAWINGS

FIGS. 2a and 2b illustrate a side view and a bottom view respectively of an exemplary stylus according to various embodiments.

FIG. 3 illustrates a cross-sectional view of an exemplary stylus according to various embodiments.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to detection of an orientation of a stylus relative to a surface. In some embodiments, the orientation of a stylus relative to a contacting surface, e.g., a touch panel, can be detected by detecting a capacitance at one or more locations on the stylus relative to the surface, and then using the capacitance(s) to determine the orientation of the stylus relative to the surface. In some embodiments, the orientation of a stylus relative to a contacting surface, e.g., a touch panel, can be detected by first detecting the orientation of the stylus relative to a reference, detecting the orientation of the contacting surface relative to the reference, and then calculating the orientation of the stylus relative to the contacting surface using the two detected orientations. Stylus orientation can advantageously be used to affect width and darkness of a resultant line displayed on the touch panel, thereby improving the realism of the stylus experience. The stylus can advantageously be used to improve touch and hover sensing and to preserve power savings in the contacting device.

Although some embodiments are described herein in terms of a stylus, it is to be understood that other input devices and/or pointing devices can be used according to various embodiments.

Although some embodiments are described herein in terms of a touch panel, it is to be understood that other touch sensitive devices capable of sensing an object touching or hovering over the devices can be used according to various embodiments.

Figure 1:
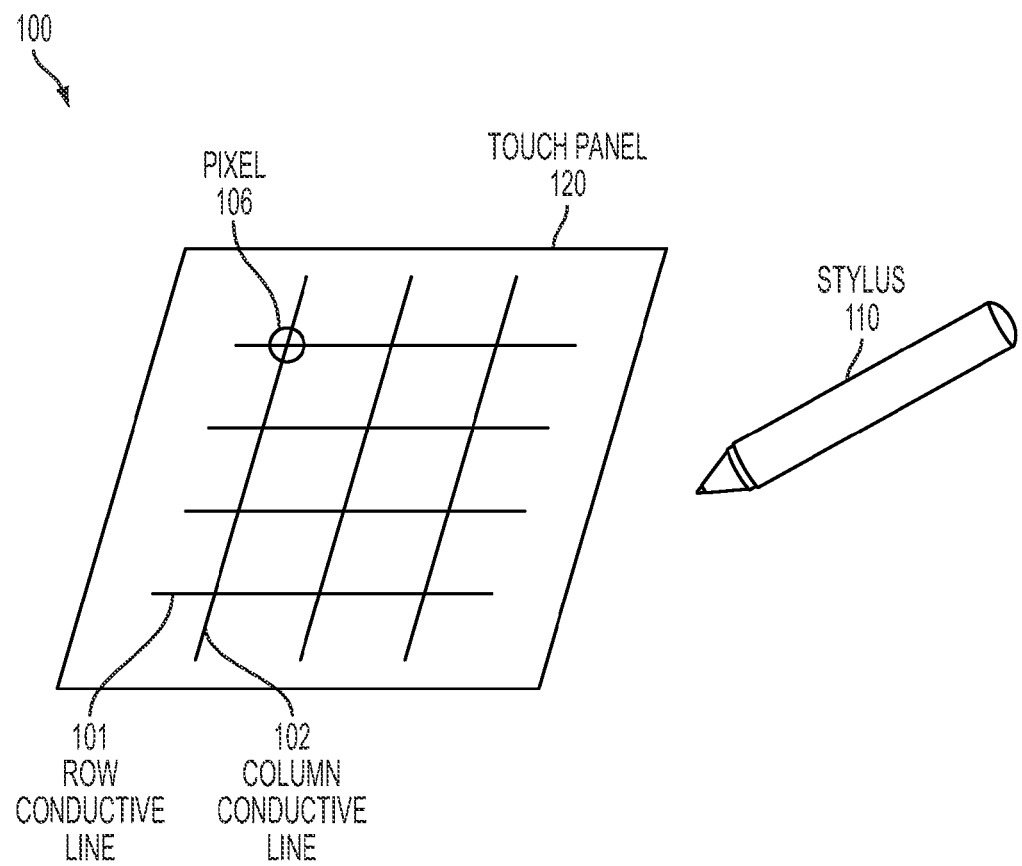
FIG. 1 illustrates an exemplary stylus for use with a touch panel according to various embodiments.

FIG. 1 illustrates an exemplary stylus for use with a touch panel according to various embodiments. In the example of FIG. 1, touch panel 120 can include an array of pixels 106 formed at the crossing points of conductive rows 101 and columns 102. Though FIG. 1 depicts the conductive elements 101, 102 in rows and columns, other configurations of conductive elements are also possible according to various embodiments.

When stylus 110 touches or hovers over a surface of the touch panel 120, the stylus can form a capacitance with one or more of the conductive rows 101 and/or columns 102 that can be detected by sensing circuitry (not shown). The stylus touch or hover can be represented in an image captured at the touch panel 120 and processed for input information regarding the stylus 110.

In some embodiments, the stylus 110 can act as a driving element stimulated by a stimulation signal to capacitively couple with a proximate conductive row 101 or column 102 of the touch panel 120, thereby forming a capacitive path for coupling charge from the stylus to that proximate row or column. The proximate row 101 or column 102 can output signals representative of the coupling charge to the sensing circuitry.

In some embodiments, the stylus 110 can act as a sensing element capacitively coupled with a proximate conductive row 101 or column 102 of the touch panel 120 that has been stimulated by a stimulation signal. The stylus 110 can then output signals representative of the coupling charge to the sensing circuitry.

FIG. 2a illustrates a side view of an exemplary stylus according to various embodiments. In the example of FIG. 2a, stylus 210 can include shaft 218 and tip 212. The tip 212 can include electrode 214 at the distal end of the tip for contacting a surface and electrode 216 proximate to the distal end and forming a ring around the tip. The electrodes 214, 216 can be any suitable conductive material, such as metal, paint, ink, and the like. In some embodiments, the tip can be replaceable. The shaft 218 can similarly be any suitable conductive material or any suitable insulating material, depending on the requirements of the stylus 210. The shaft 218 can house stylus circuitry, e.g., signal transmitting and receiving elements, signal processing elements, and the like, depending on the requirements of the stylus 210.

FIG. 2b illustrates a bottom view of the exemplary stylus of FIG. 2a according to various embodiments. In the example of FIG. 2b, stylus 210 can have a conical shaped tip 212 with electrode 214 at the distal end of the tip and electrode 216 proximate to the distal end and forming a ring around the tip.

FIG. 3 illustrates a cross-sectional view of the exemplary stylus of FIGS. 2a and 2b. In the example of FIG. 3, tip 212 of stylus 210 can have electrode 214 that forms a distal end of the tip, with the distal end portion exposed to contact a surface and another portion of the electrode extended within the tip. The tip 212 can also have electrode 216 that forms a ring around the tip, with a portion of the electrode exposed on the outer surface of the tip and another portion of the electrode extended within the tip. Insulator 315 can separate the electrodes 214, 216 and cover the extended portion of the ring electrode 216. The electrodes 214, 216 can electrically couple to circuit board 380 or other stylus circuitry for transmitting and receiving signals through connections 378, for example.

A stylus can have various orientations as it touches or hovers over a touch panel. In some embodiments, a particular action of the touch panel can be performed based on the stylus orientation. Accordingly, detecting the stylus orientation can be helpful in touch panel operation.

Figure 4A:
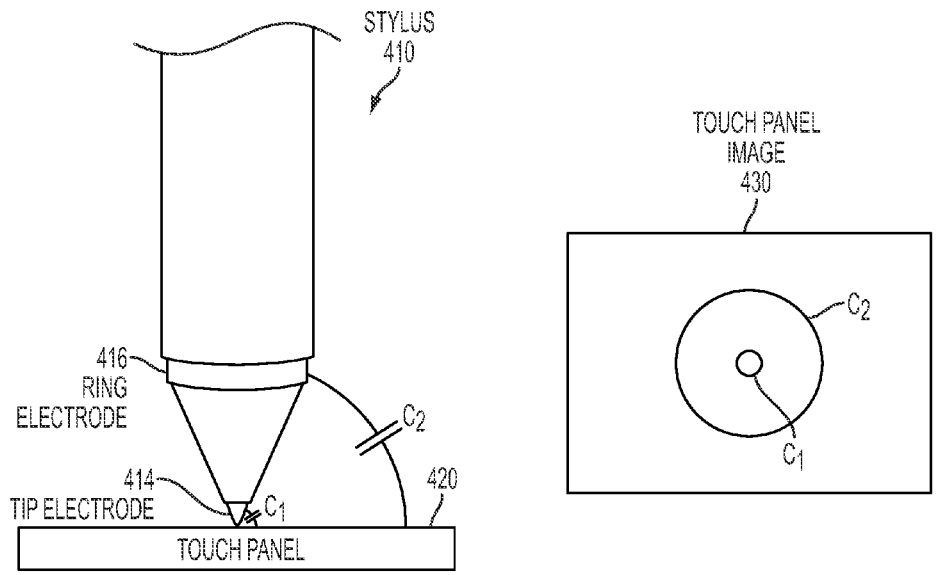
FIGS. 4a and 4b illustrates a perpendicular orientation and a tilted orientation respectively of an exemplary stylus according to various embodiments.
Figure 4B:
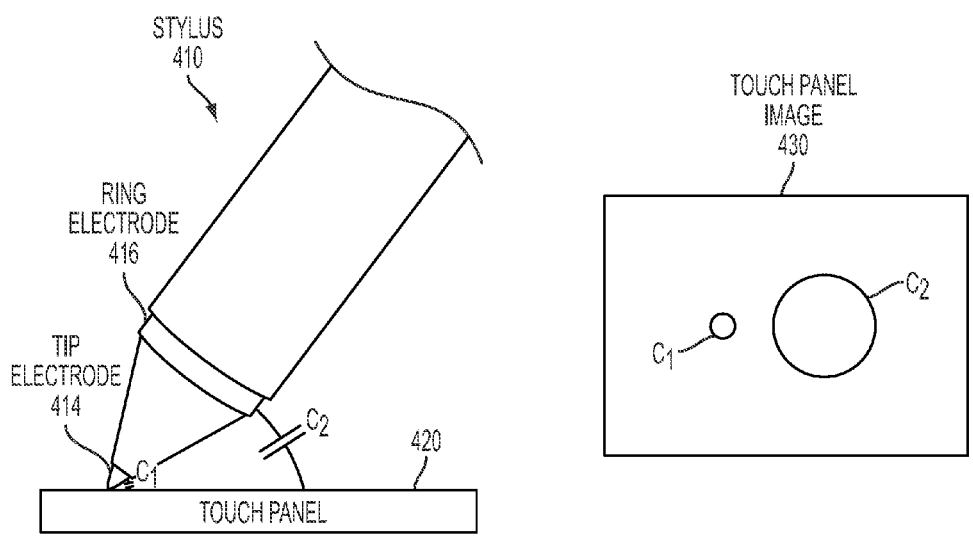

FIGS. 4a and 4b illustrate various orientations of the exemplary stylus of FIGS. 2a and 2b as it touches a touch panel according to various embodiments. In the example of FIG. 4a, stylus 410 can have a perpendicular orientation as it touches touch panel 420. As the stylus 410 touches the panel 420, tip electrode 414 can form capacitance C1 with a proximate conductive element, e.g., row(s) and/or column(s), (not shown) of the panel. Similarly, ring electrode 416 can form capacitance C2 with a proximate conductive element, e.g., row(s) and/or column(s), of the panel 420. Image 430 captured at the panel 420 can show touch or hover images resulting from the two capacitances C1, C2. Because the stylus 410 is perpendicular to the panel 420, the image 430 can show the tip capacitance C1 image surrounded by the ring capacitance C2 image.

In the example of FIG. 4b, the stylus 410 can have a tilted orientation as it touches the panel 420. As a result, the image 430 captured at the panel 420 can show a shift in the positions of the touch or hover images resulting from two capacitances C1, C2 relative to each other. Here, the ring capacitance C2 image has shifted to the right of the tip capacitance C1 image. The amount of the shift can be a function of the amount of stylus tilt. For example, the greater the tilt, the further the ring capacitance C2 image is from the tip capacitance C1 image. Conversely, the lesser the tilt, the closer the ring capacitance C2 image is and/or overlaps the tip capacitance C1 image. Therefore, by determining the proximity of the two capacitances C1, C2 images in the captured image, the amount of stylus tilt can be determined.

The image can also be used to determine the direction of the stylus tilt, e.g., upward, downward, right, left, and so on, relative to the touch panel 420. For example, in the image 430 of FIG. 4b, the ring capacitance C2 image is to the right of the tip capacitance C1 image. This can indicate that the stylus 410 is tilted to the right. If the ring capacitance C2 image is at the left of the tip capacitance C1 image, this can indicate that the stylus 410 is tilted to the left. If the ring capacitance C2 image is above the tip capacitance C1 image, this can indicate that the stylus 410 is tilted upward. If the ring capacitance C2 image is below the tip capacitance C1 image, this can indicate that the stylus 410 is tilted downward. Other tilt directions, e.g., upper left, lower right, etc., can also be determined according to the relative positions of the capacitance C1, C2 images.

By determining the proximity of the two capacitances C1, C2 to each other and their relative positions in an image, the stylus orientation can be detected.

Figure 5:
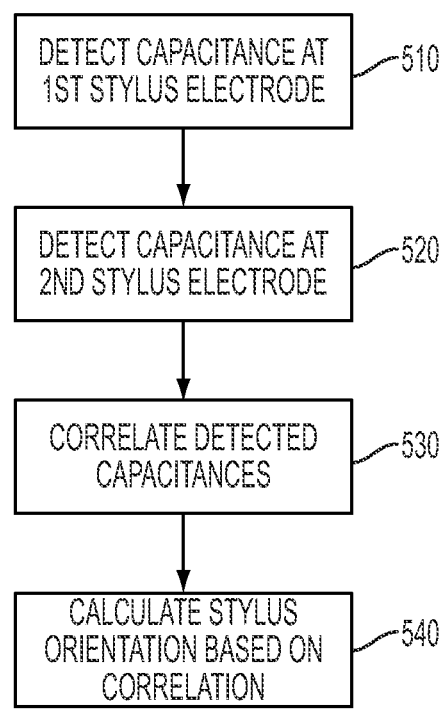
FIG. 5 illustrates an exemplary method for detecting an orientation of a stylus according to various embodiments.

FIG. 5 illustrates an exemplary method for detecting an orientation of a stylus according to various embodiments.

This method can be used with the stylus of FIGS. 2*a* and 2*b*, for example. In the example of FIG. 5, a first capacitance formed between a stylus first electrode and a contacting surface can be detected (510). Similarly, a second capacitance formed between a stylus second electrode and the contacting surface can be detected (520). In some embodiments, the first electrode can be a tip electrode and the second electrode can be a ring electrode. In some embodiments, the capacitance detection can include capturing an image that can show touch or hover images resulting from the capacitances at the touch panel and performing a suitable image processing method on the captured image to determine the locations of the capacitance images therein.

The detected capacitance images in the captured image can be correlated (530). In some embodiments, the correlation can include determining the proximity of the two capacitance images in order to determine the tilt of the stylus and determining the relative positions of the two capacitance images in order to determine the direction of the stylus tilt.

The stylus orientation can then be calculated based on the correlation (540). In some embodiments, the orientation calculation can include determining the tilt angle based on the amount of proximity between the two capacitance images in the captured image and determining the direction of the stylus tilt based on the relative positions of the two capacitance images in the captured image. In some embodiments, lookup tables can be used, where one table's entries include a tilt angle-proximity amount pairing and another table's entries includes a tilt direction-relative position pairing. The proximity amount and relative positions could be inputted to the lookup tables and the corresponding tilt angle and tilt direction outputted therefrom. In some embodiments, equations can be used, where one equation calculates tilt angle as a function of proximity amount and another equation calculates tilt direction as a function of relative position. Other orientation calculation methods are also possible according to various embodiments.

Figure 6A:
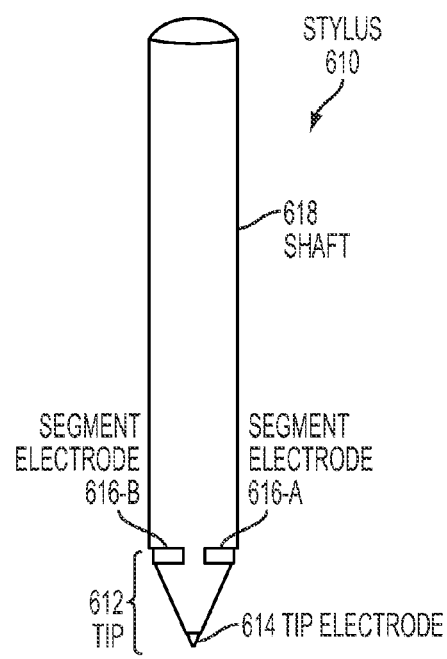
FIGS. 6a and 6b illustrate a side view and a bottom view respectively of another exemplary stylus according to various embodiments.

FIG. 6*a* illustrates a side view of another exemplary stylus according to various embodiments. In the example of FIG. 6*a*, stylus 610 can include shaft 618 and tip 612. The tip 612 can include electrode 614 at the distal end of the tip for contacting a surface and segment electrodes 616-A, 616-B, 616-C proximate to the distal end and forming a broken ring around the tip. The stylus 610 of FIG. 6*a* is like the stylus 210 of FIG. 2*a*, except that the ring electrode 216 of FIG. 2*a* is replaced with segment electrodes 616-A, 616-B, 616-C of FIG. 6*a*.

Figure 6B:
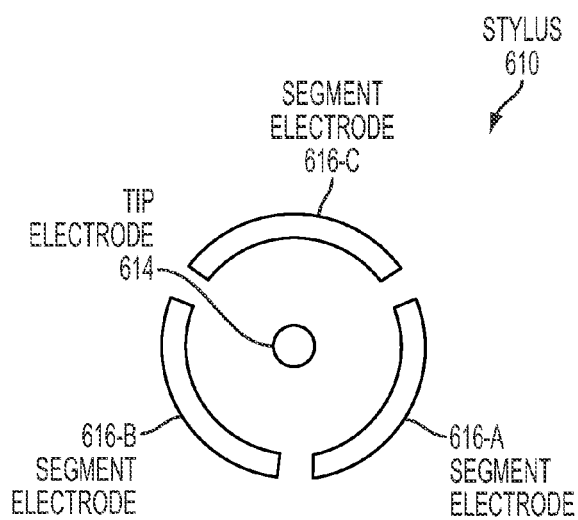

FIG. 6*b* illustrates a bottom view of the exemplary stylus of FIG. 6*a* according to various embodiments. In the example of FIG. 6*b*, stylus 610 can have a conical shaped tip 612 with electrode 614 at the distal end of the tip and segment electrodes 616-A, 616-B, 616-C proximate to the distal end and forming a broken ring around the tip. Though FIG. 6*b* depicts three segment electrodes, it is to be understood that other numbers of electrodes, e.g., two, four, five, and so on, can be used according to various embodiments.

In addition to determining stylus tilt angle and tilt direction, similar to the stylus of FIGS. 2*a* and 2*b*, stylus rotation can be determined for the stylus of FIGS. 6*a* and 6*b*, as will be described below.

Figure 7A:
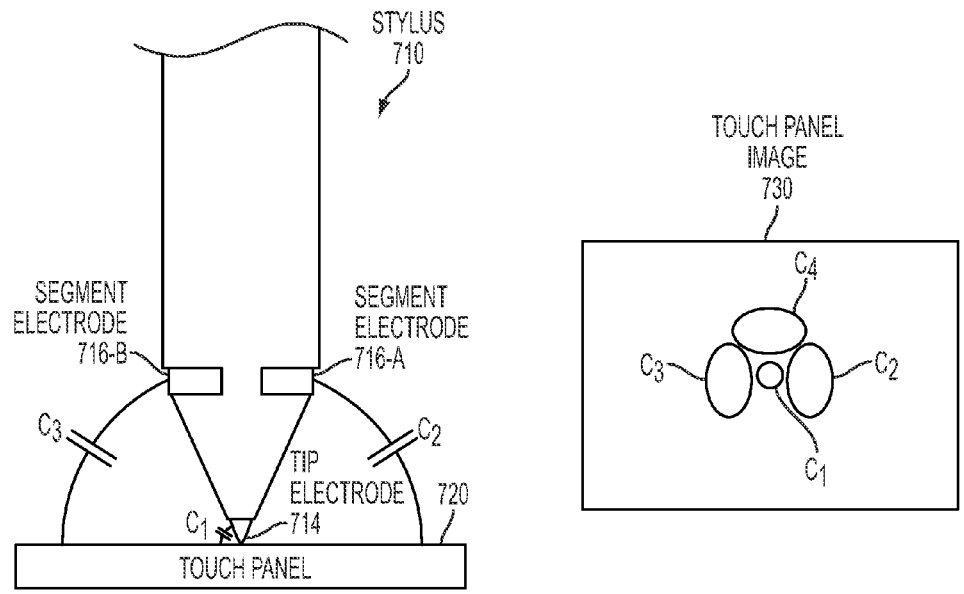
FIGS. 7a, 7b, and 7c illustrate a perpendicular orientation, a tilted orientation, and a rotated-tilted orientation respectively of an exemplary stylus according to various embodiments.
Figure 7B:
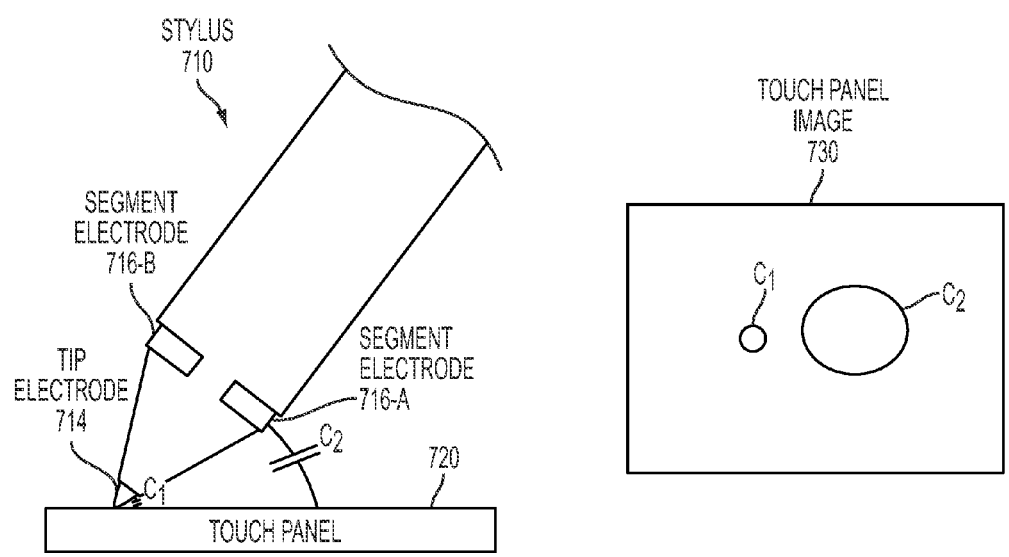
Figure 7C:
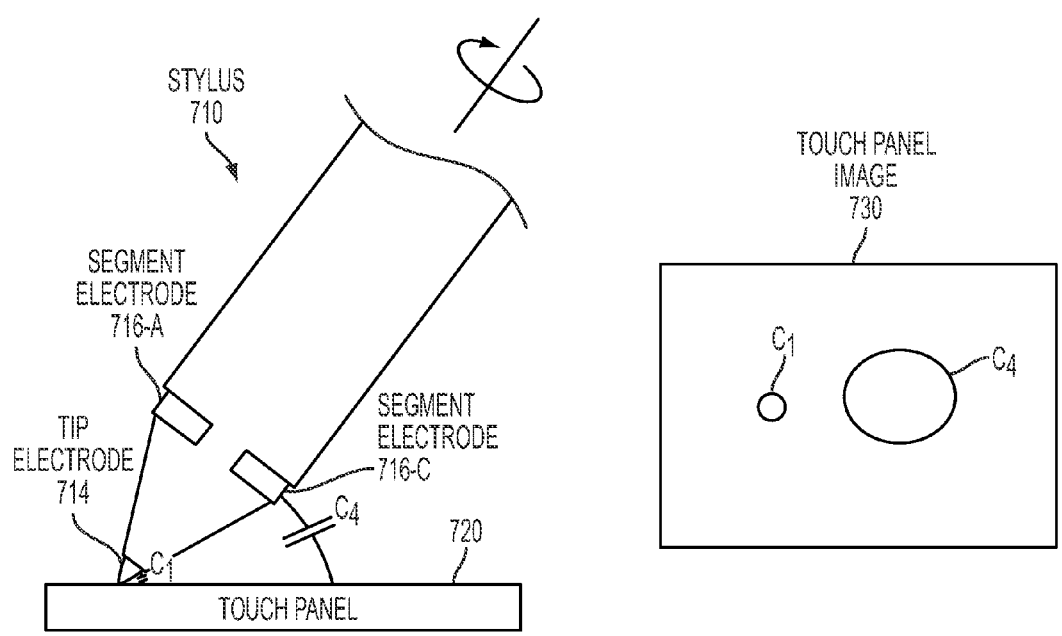

FIGS. 7*a*, 7*b*, and 7*c* illustrate various orientations of the exemplary stylus of FIGS. 6*a* and 6*b* as it touches a touch panel according to various embodiments. In the example of FIG. 7*a*, stylus 710 can have a perpendicular orientation as it touches touch panel 720. As the stylus 710 touches the panel 720, tip electrode 714 can form capacitance C1 with a proximate conductive element, e.g., row(s) and/or column(s), (not shown) of the panel. Similarly, segment electrodes 716-A, 716-B, 716-C can form capacitances C2, C3, C4, respectively with a proximate conductive element, e.g., row(s) and/or column(s), of the panel 720. Image 730 captured at the panel 720 can show touch or hover images resulting from the four capacitances C1, C2, C3, C4. Because the stylus 710 is perpendicular to the panel 720, the image 730 can show the image resulting from the tip capacitance C1 surrounded by the images resulting from the segment capacitances C2, C3, C4.

In the example of FIG. 7*b*, the stylus 710 can have a tilted orientation as it touches the panel 720. As a result, the image 730 captured at the panel 720 can show a shift in the positions of the tip capacitances C1 image and the segment capacitance image (in this case, segment capacitance C2 image) of the electrode (in this case, electrode 716-A) closest to the panel 720. The other segment capacitance images can disappear from the image 730, as illustrated here. Alternatively, the other segment capacitance images can have smaller images that also shift depending on how the stylus is tilted and rotated. By determining the proximity of the two capacitances C1, C2 images in the captured image, the amount of stylus tilt can be determined.

The captured image 730 can also be used to determine the direction of the stylus tilt relative to the touch panel 720. For example, in the image 730 of FIG. 7*b*, the segment capacitance C2 image is to the right of the tip capacitance C1 image. This can indicate that the stylus 710 is tilted to the right. If the segment capacitance C2 image is at the left of the tip capacitance C1 image, this can indicate that the stylus 710 is tilted to the left. Other tilt directions, e.g., upward, downward, upper left, lower right, etc., can also be determined according to the relative positions of the capacitance C1, C2 images (and any of the other segment capacitance images, if they are also shown in the captured image).

In the example of FIG. 7*c*, the stylus 710 can have a rotated-tilted orientation as it touches the panel 720. As a result, the image 730 captured at the panel 720 can show another segment capacitance image (in this case, segment capacitance C4 image) of another electrode (in this case, electrode 716-C) closest to the panel 720. The image 730 can be used to determine the amount of stylus tilt and tilt direction in the same manner as in FIG. 7*b*.

To determine the amount of stylus rotation, the strengths of the capacitances C2, C3, C4 at the segment electrodes 716-A, 716-B, 716-C, respectively, can be used. The closer an electrode is to the panel 720, the stronger the capacitive coupling between the electrode and the panel, hence the stronger the capacitance. By estimating the strength of the capacitances relative to each other, the segment electrode closest to the panel can be determined. In some embodiments, the relative strength of the capacitances C2, C3, C4 can be estimated based on the magnitudes of their corresponding images in the captured image. For example, in FIG. 7*b*, the segment electrode 716-A would form the strongest of the capacitances and the other segment electrodes 716-B, 716-C would form weaker capacitances. In FIG. 7*c*, the segment electrode 716-C would form the strongest of the capacitances and the other electrodes 716-A, 716-B would form weaker capacitances. Accordingly, by measuring the decrease in the magnitude of the capacitance C2 image of electrode 716-A and the increase in the magnitude of the capacitance C4 image of electrode 716-C over the time period indicated by FIGS. 7*b* and 7*c*, a determination can be made regarding how much the stylus 710 rotated between the orientations illustrated in FIGS. 7*b* and 7*c*.

Additionally, by determining the relative positions of the magnitude changes, the stylus rotation can be determined.

For example, as the stylus rotates clockwise, the capacitance C2, C4 images correspondingly rotate clockwise as their magnitudes change. Accordingly, a determination can be made regarding how much the stylus 710 rotated between the orientations illustrated in FIGS. 7b and 7c.

By determining the proximity of the capacitance C1, C2, C3, C4 images to each other and their relative positions in the captured image and by determining the relative strengths of the segment capacitance C2, C3, C4 images and/or their relative position changes in the captured image, the stylus orientation can be detected.

Figure 8:
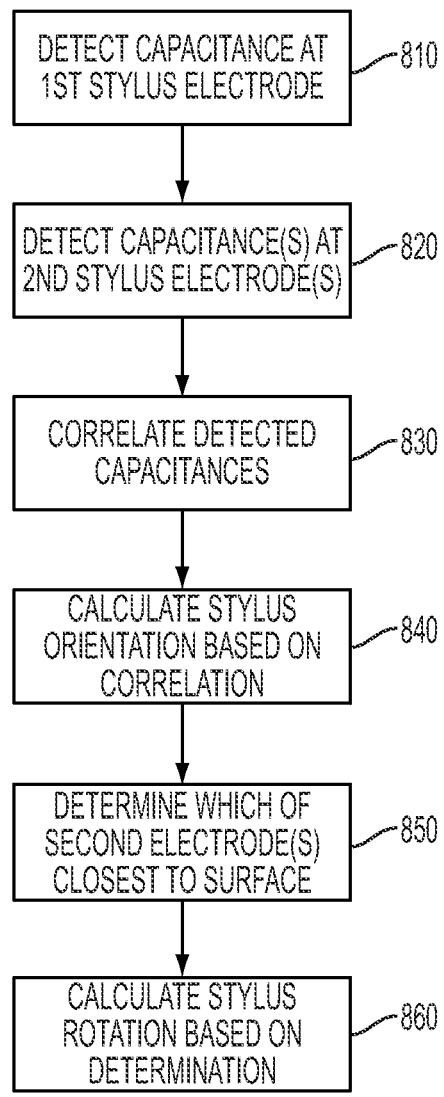
FIG. 8 illustrates another exemplary method for detecting an orientation of a stylus according to various embodiments.

FIG. 8 illustrates another exemplary method for detecting an orientation of a stylus according to various embodiments. This method can be used with the stylus of FIGS. 6a and 6b, for example. In the example of FIG. 8, a first capacitance formed between a stylus first electrode and a contacting surface can be detected (810). Similarly, one or more second capacitances formed between one or more stylus second electrodes and the contacting surface can be detected (820). In some embodiments, the first electrode can be a tip electrode and the second electrode(s) can be segment electrode(s). In some embodiments, the capacitance detection can include capturing an image that can show touch or hover images resulting from the capacitances at the touch panel and performing a suitable image processing method on the captured image to determine the locations of the capacitance images in the captured image.

The detected capacitance images in the captured image can be correlated (830). In some embodiments, the correlation can include determining the proximity of the capacitance images in the captured image in order to determine the tilt of the stylus and determining the relative positions of the capacitance images in the captured image in order to determine the direction of the stylus tilt.

The stylus tilt angle and tilt direction can then be calculated based on the correlation (840). In some embodiments, the calculation can include determining the tilt angle based on the amount of proximity between the capacitance images in the captured image and determining the direction of the stylus tilt based on the relative positions of the capacitance images in the captured image. In some embodiments, lookup tables can be used, where one table's entries include a tilt angle-proximity amount pairing and another table's entries includes a tilt direction-relative position pairing. The proximity amount and relative positions could be inputted to the lookup tables and the corresponding tilt angle and tilt direction outputted therefrom. In some embodiments, equations can be used, where one equation calculates tilt angle as a function of proximity amount and other equation calculates tilt direction as a function of relative position. Other orientation calculation methods are also possible according to various embodiments.

A determination can be made of which of the second electrodes is closest to the contacting surface (850). In some embodiments, the relative strengths of the capacitance images of the second electrodes in the captured image can be estimated and the electrode with the strongest capacitance image magnitude determined to be the one closest to the contacting surface.

The stylus rotation can then be calculated based on the determination (860). In some embodiments, the rotation calculation can include detecting the capacitances of each second electrode over a particular time period, comparing each second electrode's capacitance images over the time period, and determining each second electrode's capacitance image magnitude change over that time period. A capacitance image increase of a particular second electrode can indicate a rotation of that electrode toward the contacting surface. Conversely, a capacitance image decrease of a particular second electrode can indicate a rotation of that electrode away from the contacting surface. The amount and direction of the image changes and the second electrodes involved can indicate the amount and direction of the rotation. For example, if one of the second electrodes experiences a small capacitance increase and an adjacent (in a clockwise direction) second electrode experiences a small capacitance decrease, e.g., as shown by a respective increase and decrease of image magnitudes, it can be determined that the stylus made a small rotation clockwise. Similar determinations can be made for a large capacitance increase and concurrent capacitance decrease in these respective electrodes. Conversely, if one of the second electrodes experiences a small capacitance decrease and an adjacent (in a clockwise direction) second electrode experiences a small capacitance increase, e.g., as shown by a respective decrease and increase of image magnitudes, it can be determined that the stylus made a small rotation counterclockwise. Similar determinations can be made for a large capacitance decrease and concurrent capacitance increase in these respective electrodes. In some embodiments, a lookup table can be used, where the table's entries include a capacitance change amount-rotation amount pairing. The capacitance change amount for the appropriate second electrodes can be inputted to the lookup table and the corresponding rotation amount outputted therefrom.

In some embodiments, rather than using image magnitude changes as described in the previous paragraph, image position changes can be used to determine the stylus rotation. As such, the rotation calculation can include detecting the capacitances of each second electrode over a particular time period, comparing each second electrode's capacitance images over the time period, and determining each second electrode's capacitance image position change over that time period. A capacitance image clockwise shift of a particular second electrode can indicate a clockwise rotation of the stylus. Conversely, a capacitance image counterclockwise shift of a particular second electrode can indicate a counterclockwise rotation of stylus. The amount and direction of the image shift and the second electrodes involved can indicate the amount and direction of the stylus rotation. For example, if one of the second electrodes experiences a small clockwise shift, e.g., as shown by a small shift in the capacitance image in the captured images, it can be determined that the stylus made a small rotation clockwise. Similar determinations can be made for a large clockwise rotation. Conversely, if one of the second electrodes experiences a small counterclockwise shift, e.g., as shown by a small shift in the capacitance image in the captured images, it can be determined that the stylus made a small rotation counterclockwise. Similar determinations can be made for a large counterclockwise rotation. In some embodiments, a lookup table can be used, where the table's entries include a capacitance image shift amount-rotation amount pairing. The capacitance image shift amount for the appropriate second electrodes can be inputted to the lookup table and the corresponding rotation amount outputted therefrom.

Figure 9:
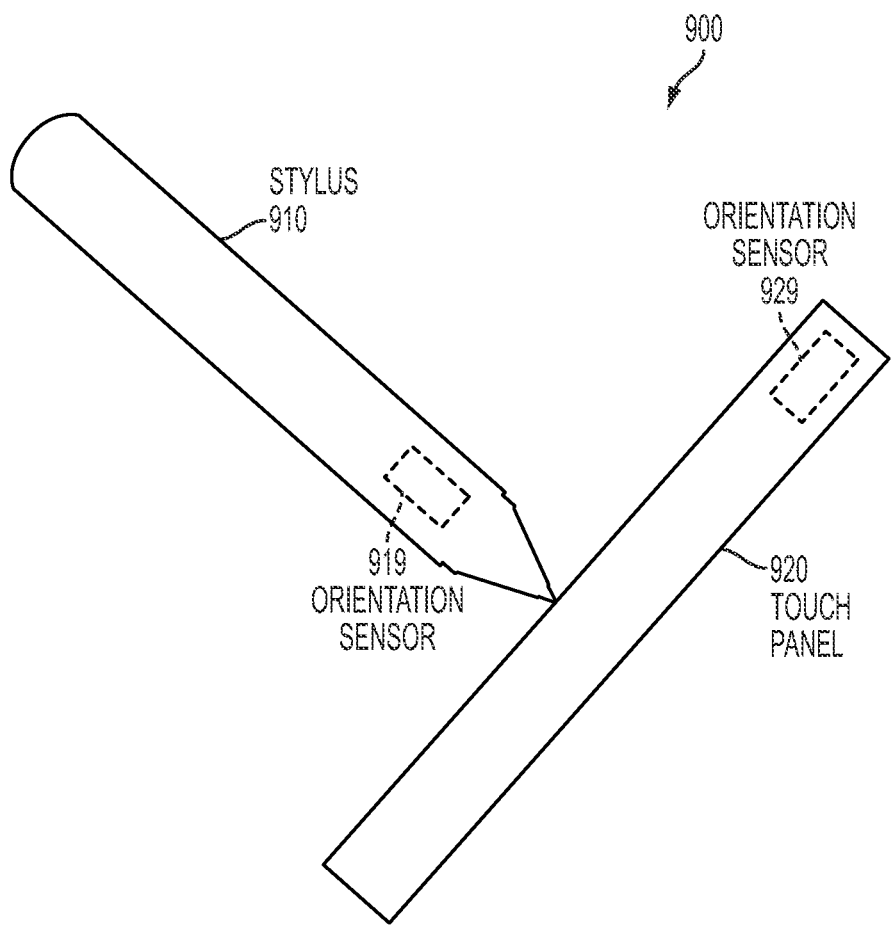
FIG. 9 illustrates an exemplary stylus having an orientation sensor for use with a touch panel also having an orientation sensor according to various embodiments.

FIG. 9 illustrates an exemplary stylus having an orientation sensor for use with a touch panel also having an orientation sensor according to various embodiments. In the example of FIG. 9, stylus 910 can include orientation sensor 919 for detecting the stylus orientation relative to a reference, e.g., the earth. In some embodiments, the sensor 919 can be an accelerometer, a gyroscope, a magnetometer, and the like. Touch panel 920 can orientation sensor 929 for detecting the panel orientation relative to the reference. In some embodiments, the sensor 929 can be an accelerometer, a gyroscope, a magnetometer, and the like. Here, the orientation of the stylus 910 can be determined relative to the orientation of the panel 920, which can be mobile.

Figure 10:
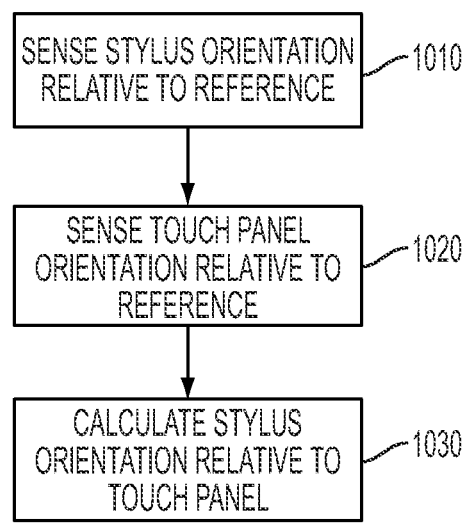
FIG. 10 illustrates another exemplary method for detecting an orientation of a stylus according to various embodiments.

FIG. 10 illustrates another exemplary method for detecting an orientation of a stylus according to various embodiments. This method can be used with the stylus of FIG. 9, for example. In the example of FIG. 10, a sensor in a stylus can detect the stylus orientation relative to a reference, e.g., the earth (1010). A sensor in a mobile touch panel can detect the panel orientation also relative to the reference (1020). The orientation of the stylus relative to the panel can then be calculated based on the two sensed orientations (1030). In some embodiments, the calculation can include the stylus transmitting its sensor reading via wired or wireless communication to a processor, the panel transmitting its sensor reading also to the processor, and the processor calculating the orientation of the stylus based on the two transmitted orientations. In some embodiments, the processor can be in the panel, in a touch sensitive device incorporating the panel, or in a host device. In some embodiments, the calculation can be done on the stylus processor with the panel transmitting its sensor reading to the stylus. The stylus can then transmit its calculated orientation back to the panel processor, the touch sensitive device processor, or the host device processor.

In some embodiments, the stylus can include a second sensor to detect its orientation relative to the reference. In some embodiments, the second sensor can be a gyroscope, a magnetometer, or the like. The sensor readings from the two sensors in the stylus can then be compared to verify the orientation of the stylus. The use of the second sensor can be particularly helpful to prevent false or noisy stylus orientation readings caused by small inadvertent movement of the stylus.

Figure 11:
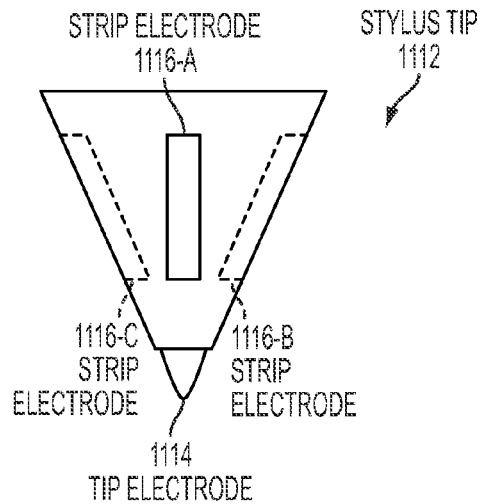
FIG. 11 illustrates an exemplary stylus tip having strip electrodes according to various embodiments.

FIG. 11 illustrates an exemplary stylus tip having strip electrodes according to various embodiments. In the example of FIG. 11, tip 1112 can have electrode 1114 at a distal end for contacting a surface and strip electrodes 1116-A, 1116-B, 1116-C proximate to the distal end and aligned in parallel around the tip. The strip electrodes can perform in a similar manner as the segment electrodes of FIGS. 6a and 6b. Although FIG. 11 depicts three strip electrodes, it is to be understood that any other number of multiple electrodes can be used according to various embodiments.

Figure 12:
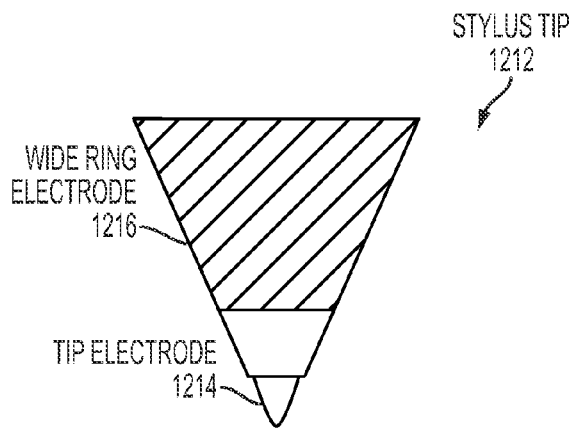
FIG. 12 illustrates an exemplary stylus tip having a wide ring electrode according to various embodiments.

FIG. 12 illustrates an exemplary stylus tip having a wide ring electrode according to various embodiments. This stylus tip is similar to that of FIGS. 2a and 2b with the exception that ring electrode 1216 in FIG. 12 is wider. The wider ring electrode can perform in a similar manner as the ring electrode of FIGS. 2a and 2b.

Figure 13:
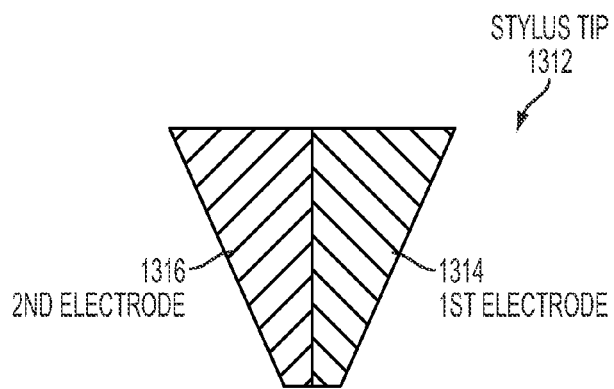
FIG. 13 illustrates an exemplary flat stylus tip according to various embodiments.

FIG. 13 illustrates an exemplary stylus flat tip according to various embodiments. In the example of FIG. 13, two electrodes 1314, 1316 can be placed side by side to form stylus tip 1312. A distal end of each electrode 1314, 1316 can be flattened to form the stylus flat tip.

To detect the orientation of a stylus having the flat tip of FIG. 13, an image of the capacitances at the electrodes 1314, 1316 can be captured. In a perpendicular orientation, the image can produce a substantially symmetric capacitance image. As the stylus tilts, the image can produce an asymmetric capacitance image. The amount of asymmetry can indicate the amount of tilt. The direction of the tilt can be determined from the direction of the asymmetry in the capacitance image. By determining the asymmetry and its direction, the stylus tilt angle and tilt direction can be determined.

In addition, the stylus rotation can be determined. This determination can include detecting the capacitances of the two electrodes 1314, 1316 over a particular time period, comparing each electrode's capacitances over the time period, and determining each electrode's capacitance change over that time period. A capacitance increase of a particular electrode can indicate a rotation of that electrode toward the contacting surface. Conversely, a capacitance decrease of a particular electrode can indicate a rotation of that electrode away from the contacting surface.

As described previously, the stylus can act as a driving element, a sensing element, or both.

Figure 14A:
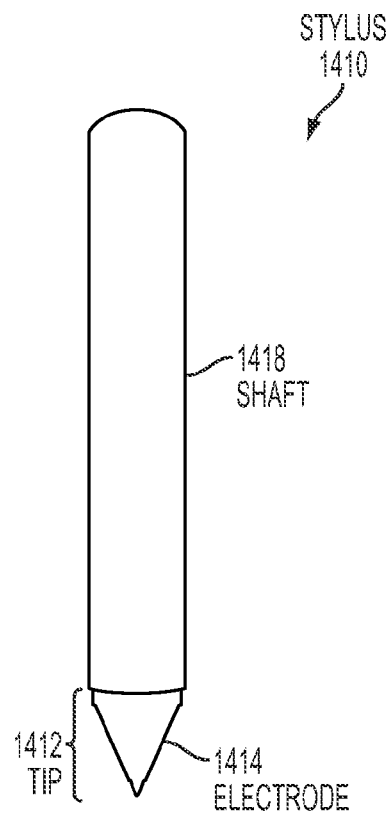
FIGS. 14a and 14b illustrate a side view and a bottom view respectively of another exemplary stylus according to various embodiments.

FIG. 14a illustrates a side view of an exemplary stylus according to various embodiments. In the example of FIG. 14a, stylus 1410 can include shaft 1418 and tip 1412. The tip 1412 can include electrode 1414 forming the entire tip for contacting a surface. The stylus 1410 of FIG. 14a is like the stylus 210 of FIG. 2a, except that the tip electrode 214 and the ring electrode 216 of FIG. 2a are replaced with the single large electrode 1414 of FIG. 14a.

Figure 14B:
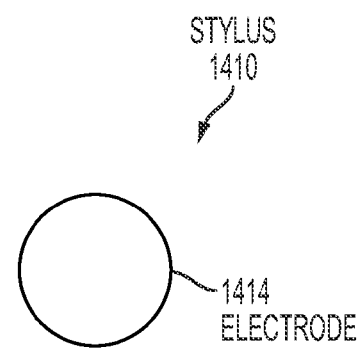

FIG. 14b illustrates a bottom view of the exemplary stylus of FIG. 14a according to various embodiments. In the example of FIG. 14b, stylus 1410 can have a conical shaped tip 1412 with electrode 1414 forming the entire tip.

Figure 15A:
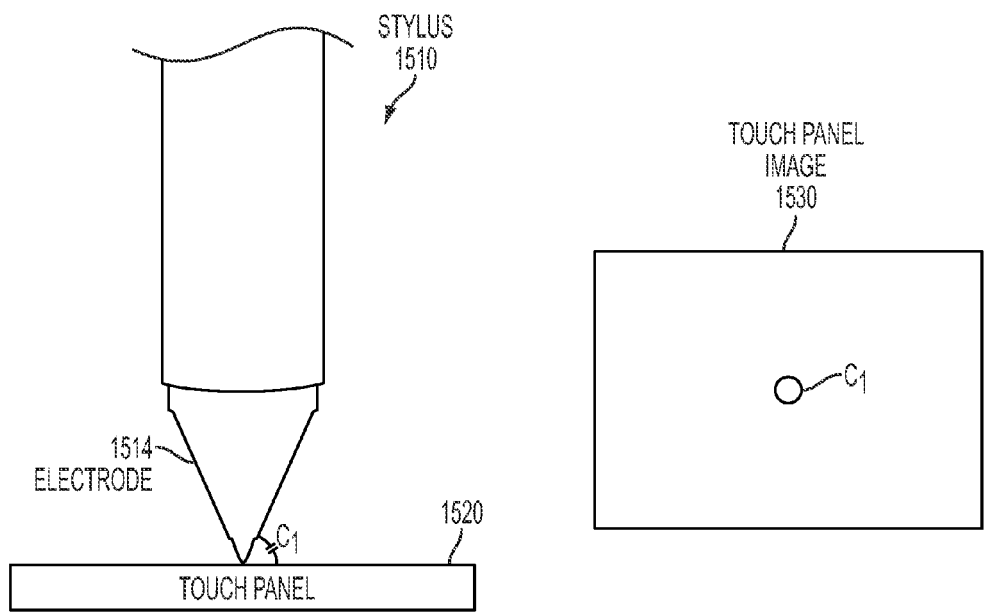
FIGS. 15a and 15b illustrate a perpendicular orientation and a tilted orientation respectively of an exemplary stylus according to various embodiments.
Figure 15B:
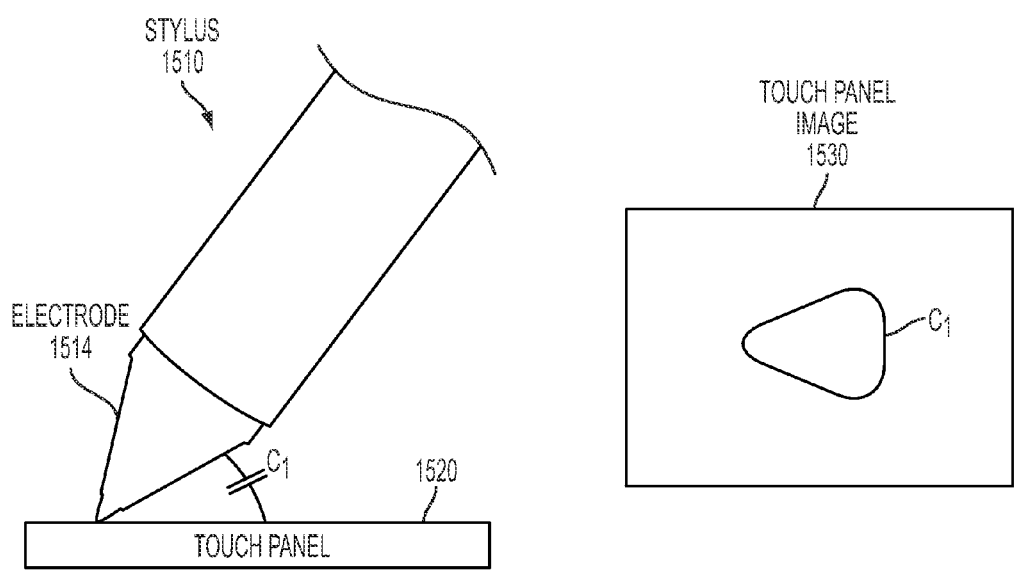

FIGS. 15a and 15b illustrate various orientations of the exemplary stylus of FIGS. 14a and 14b as it touches a touch panel according to various embodiments. In the example of FIG. 15a, stylus 1510 can have a perpendicular orientation as it touches touch panel 1520. As the stylus 1510 touches the panel 1520, electrode 1514 can form capacitance C1 with a proximate conductive element, e.g., row(s) and/or column(s), (not shown) of the panel. Image 1530 captured at the panel 1520 can show touch or hover images resulting from the capacitance C1. Because the stylus 1510 is perpendicular to the panel 1520, the image 1530 can show the capacitance C1 image as a small circle.

In the example of FIG. 15b, the stylus 1510 can have a tilted orientation as it touches the panel 1520. As a result, the image 1530 captured at the panel 1520 can show a triangular shape and larger size in the touch or hover image resulting from capacitance C1. The shape and size of the capacitance C1 image can be a function of the amount of stylus tilt. For example, the greater the tilt, the larger and more triangular the capacitance C1 image shape. Conversely, the lesser the tilt, the smaller and more circular the capacitance C1 image shape. Therefore, by determining the shape and size of the capacitance C1 image in the captured image, the amount of stylus tilt (e.g., the tilt angle) can be determined.

The image 1530 can also be used to determine the direction of the stylus tilt, e.g., upward, downward, right, left, and so on, relative to the touch panel 1520. For example, in the image 1530 of FIG. 15b, the capacitance C1 image has a triangular shape with the triangle base to the right of the triangle apex in the captured image 1530. This can indicate that the stylus 1510 is tilted to the right. If the capacitance C1 image has a triangular shape with the base to the left of the apex in the captured image 1530, this can indicate that the stylus 1510 is tilted to the left. Other tilt directions, e.g., upward, downward, upper left, lower right, etc., can also be determined according to the direction of the capacitance C1 image's triangular base.

By determining the size and shape in an image, the stylus orientation, e.g., the tilt angle and the tilt direction, can be detected.

Figure 16:
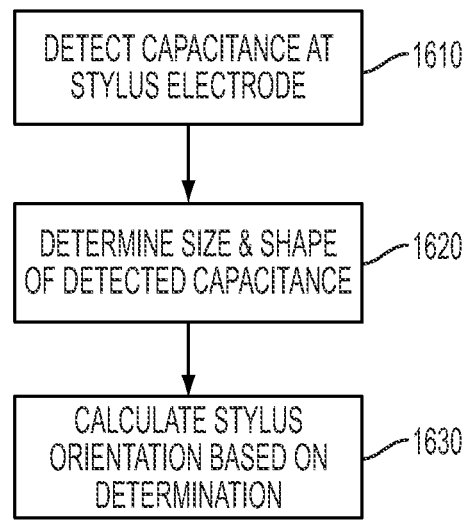
FIG. 16 illustrates another exemplary method for detecting an orientation of a stylus according to various embodiments.

FIG. 16 illustrates another exemplary method for detecting an orientation of a stylus according to various embodiments. This method can be used with the stylus of FIGS. 14a and 14b, for example. In the example of FIG. 16, a capacitance formed between a stylus electrode and a contacting surface can be detected (1610). In some embodiments, the electrode can be a single large electrode that forms the stylus tip. In some embodiments, the capacitance detection can include capturing an image that can show touch or hover images resulting from the capacitance at the touch panel and performing a suitable image processing method on the captured image to determine the location of the capacitance image therein.

The size and shape of the detected capacitance image in the captured image can be determined (1620). In some embodiments, performing a suitable image processing method on the captured image can determine the size and shape of the capacitance image.

The stylus orientation can then be calculated based on the determination (1630). In some embodiments, the orientation calculation can include determining the tilt angle based on the determined size and shape of the capacitance image and determining the direction of the stylus tilt based on the location of the triangular base relative to the triangle apex of the capacitance image. In some embodiments, lookup tables can be used, where one table's entries include a tilt angle-shape-size pairing and another table's entries includes a tilt direction-base location pairing. The shape, size, and base locations could be inputted to the lookup tables and the corresponding tilt angle and tilt direction outputted therefrom. In some embodiments, equations can be used, where one equation calculates tilt angle as a function of shape and size and another equation calculates tilt direction as a function of triangular base location. Other orientation calculation methods are also possible according to various embodiments.

Figure 17:
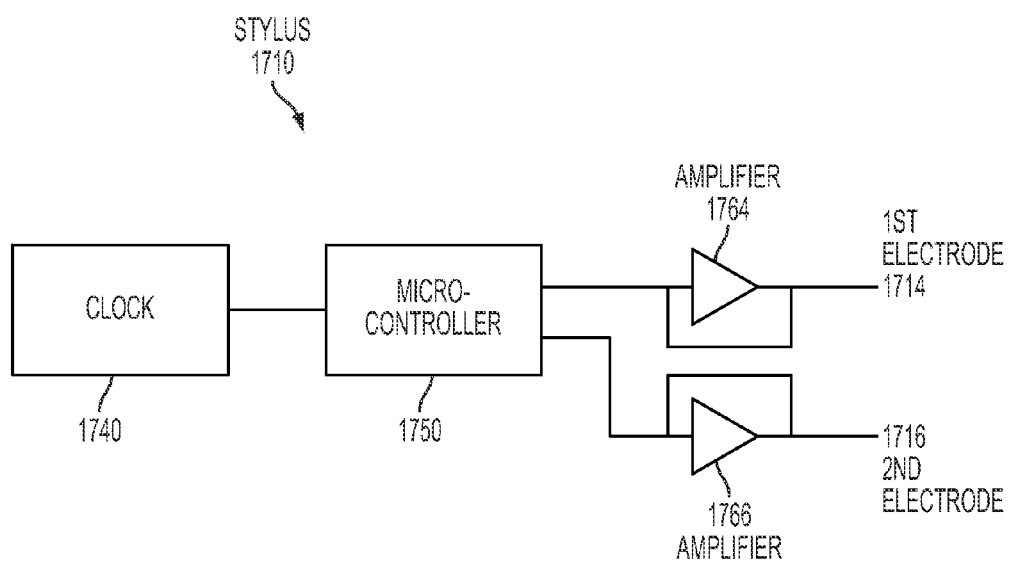
FIG. 17 illustrates exemplary drive circuitry for a stylus according to various embodiments.

FIG. 17 illustrates exemplary drive circuitry of a stylus according to various embodiments. In the example of FIG. 17, stylus 1710 can house drive circuitry to drive the stylus to capacitively couple with proximate conductive elements of a touch panel. The conductive elements can then output capacitance readings for further processing. The stylus driving circuitry can include clock 1740 to provide a drive signal, microcontroller 1750 to control the drive signal, amplifier 1764 to gain up the clock signal to electrode 1714, and amplifier 1766 to gain up the clock signal to electrode 1716. In some embodiments, electrode 1714 can be an electrode at the distal end of the stylus tip and electrode 1716 can be one or more electrodes proximate to the distal end of the stylus tip and placed around the stylus tip. In some embodiments, the signals to the two electrodes 1714, 1716 can be the same. In some embodiments, the signals to the two electrodes 1714, 1716 can be different in order to differentiate between them.

Figure 18:
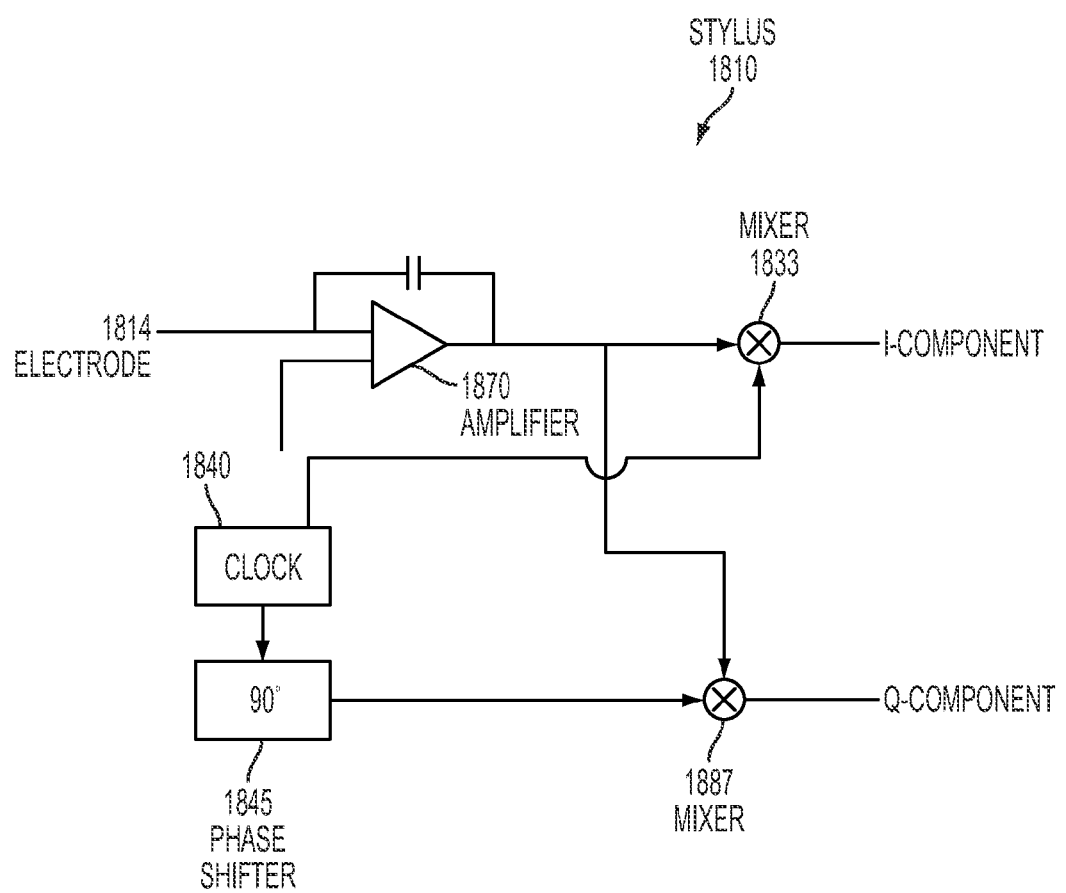
FIG. 18 illustrates exemplary sense circuitry for a stylus according to various embodiments.

FIG. 18 illustrates exemplary sense circuitry of a stylus according to various embodiments. In the example of FIG. 18, stylus 1810 can house sense circuitry to sense a capacitance from proximate conductive elements of a touch panel capacitively coupled to the stylus. The stylus can output the capacitance readings for further processing. The stylus sensing circuitry can include amplifier 1870 to receive the capacitance reading from the panel, clock 1840 to generate a demodulation signal, phase shifter 1845 to generate a phase-shifted demodulation signal, mixer 1883 to demodulate the capacitance reading with an in-phase demodulation frequency component, and mixer 1887 to demodulate the capacitance reading with a quadrature demodulation frequency component. The demodulated results can be further processed according to various embodiments.

In some embodiments, a stylus can house both driving and sensing circuitry and can include a switching mechanism couple between the two circuits for switching between driving and sensing according to the requirements of the system in which the stylus is used.

Figure 19:
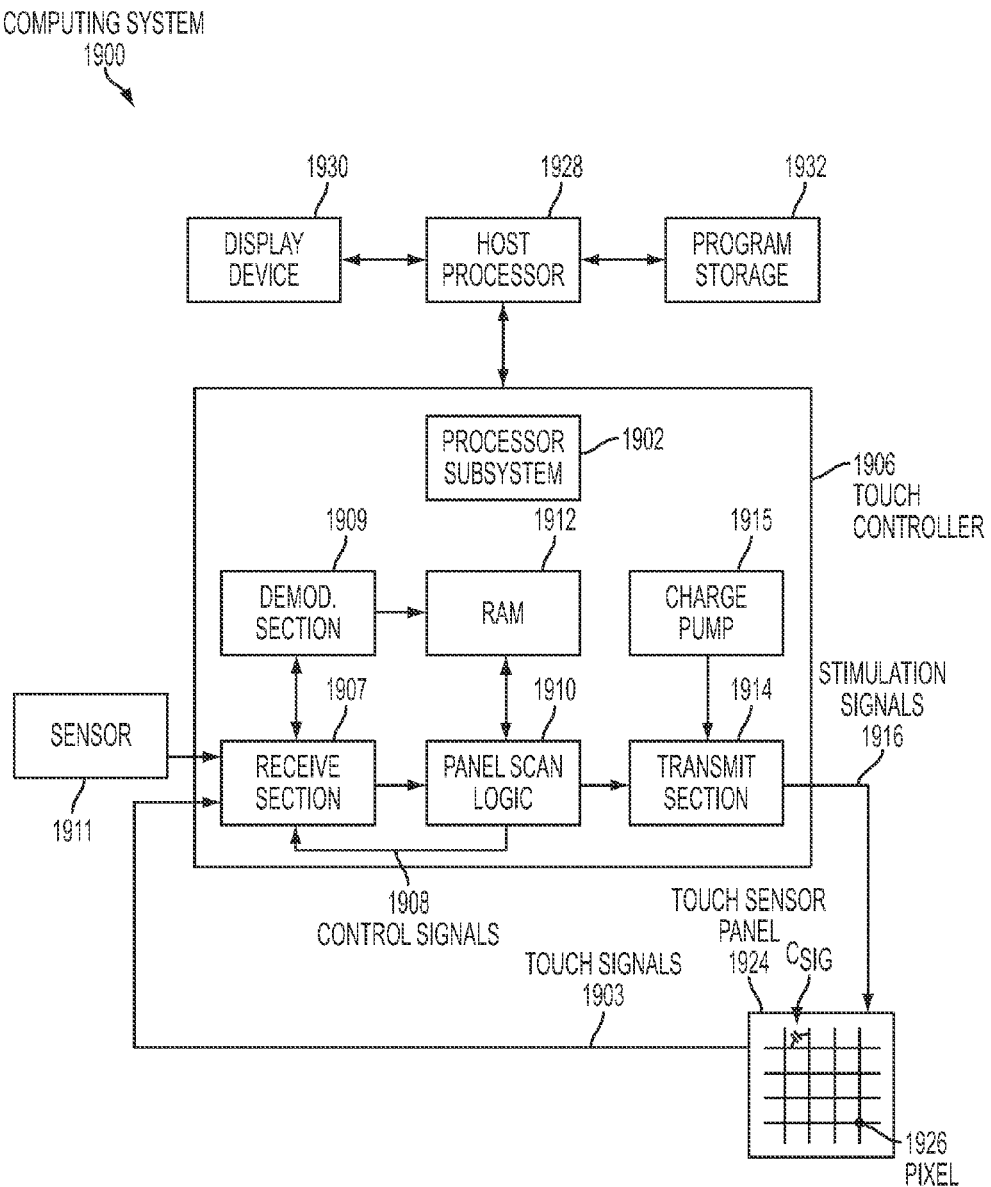
FIG. 19 illustrates an exemplary computing system for use with a stylus according to various embodiments.

FIG. 19 illustrates an exemplary computing system that can use a stylus according to various embodiments. In the example of FIG. 19, computing system 1900 can include touch controller 1906. The touch controller 1906 can be a single application specific integrated circuit (ASIC) that can include one or more processor subsystems 1902, which can include one or more main processors, such as ARM968 processors or other processors with similar functionality and capabilities. However, in other embodiments, the processor functionality can be implemented instead by dedicated logic, such as a state machine. The processor subsystems 1902 can also include peripherals (not shown) such as random access memory (RAM) or other types of memory or storage, watchdog timers and the like. The touch controller 1906 can also include receive section 1907 for receiving signals, such as touch (or sense) signals 1903 of one or more sense channels (not shown), other signals from other sensors such as sensor 1911, etc. The touch controller 1906 can also include demodulation section 1909 such as a multistage vector demodulation engine, panel scan logic 1910, and transmit section 1914 for transmitting stimulation signals 1916 to touch panel 1924 to drive the panel. The scan logic 1910 can access RAM 1912, autonomously read data from the sense channels, and provide control for the sense channels. In addition, the scan logic 1910 can control the transmit section 1914 to generate the stimulation signals 1916 at various frequencies and phases that can be selectively applied to rows of the touch panel 1924.

The touch controller 1906 can also include charge pump 1915, which can be used to generate the supply voltage for the transmit section 1914. The stimulation signals 1916 can have amplitudes higher than the maximum voltage by cascading two charge store devices, e.g., capacitors, together to form the charge pump 1915. Therefore, the stimulus voltage can be higher (e.g., 6V) than the voltage level a single capacitor can handle (e.g., 3.6V). Although FIG. 19 shows the charge pump 1915 separate from the transmit section 1914, the charge pump can be part of the transmit section.

Computing system 1900 can include host processor 1928 for receiving outputs from the processor subsystems 1902 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 1928 can also perform additional functions that may not be related to touch processing, and can be connected to program storage 1932 and display device 1930 such as an LCD for providing a UI to a user of the device. Display device 1930 together with touch panel 1924, when located partially or entirely under the touch panel, can form a touch screen.

Touch panel 1924 can include a capacitive sensing medium having drive lines and sense lines. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. Drive lines can be driven by stimulation signals 1916 and resulting touch signals 1903 generated in sense lines can be transmitted to receive section 1907 in touch controller 1906. In this way, drive lines and sense lines can be part of the touch and hover sensing circuitry that can interact to form capacitive sensing nodes, which can be thought of as touch picture elements (touch pixels), such as touch pixels 1926. This way of understanding can be particularly useful when touch panel 1924 can be viewed as capturing an "image" of touch. In other words, after touch controller 1906 has determined whether a touch or hover has been detected at each touch pixel in the touch panel, the pattern of touch pixels in the touch panel at which a touch or hover occurred can be thought of as an "image" of touch (e.g. a pattern of fingers touching or hovering over the touch panel).

A stylus according to various embodiments can be used to contact the touch panel 1924. The stylus orientation can provide additional information to the computing system 1900 for improved performance.

Note that one or more of the functions described above, can be performed, for example, by firmware stored in memory (e.g., one of the peripherals) and executed by the processor subsystem 1902, or stored in the program storage 1932 and executed by the host processor 1928. The firmware can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch panel, as described in FIG. 19, can sense touch and hover according to various embodiments. In addition, the touch panel described herein can be either single- or multi-touch.

Figure 20:
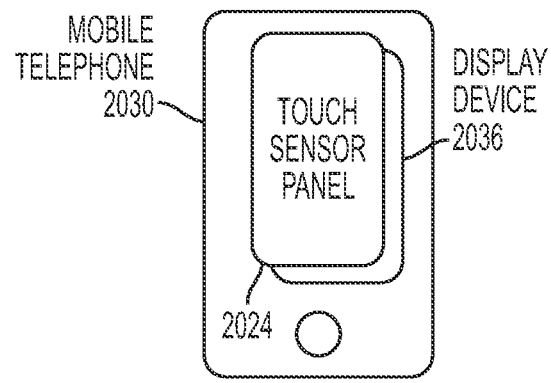
FIG. 20 illustrates an exemplary mobile telephone for use with a stylus according to various embodiments.

FIG. 20 illustrates an exemplary mobile telephone 2030 that can include touch panel 2024, display device 2036, and other computing system blocks for use with a stylus according to various embodiments.

Figure 21:
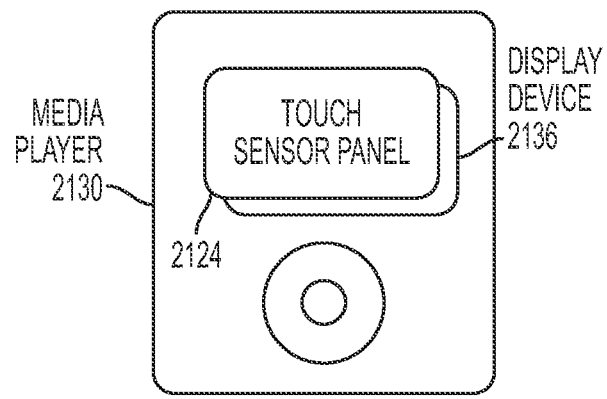
FIG. 21 illustrates an exemplary digital media player for use with a stylus according to various embodiments.

FIG. 21 illustrates an exemplary digital media player 2130 that can include touch panel 2124, display device 2136, and other computing system blocks for use with a stylus according to various embodiments.

Figure 22:
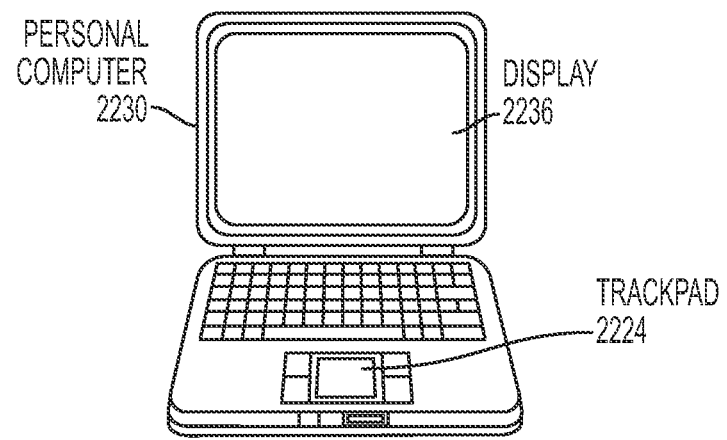
FIG. 22 illustrates an exemplary personal computer for use with a stylus according to various embodiments.

FIG. 22 illustrates an exemplary personal computer 2230 that can include touch pad 2224, display 2236, and other computing system blocks for use with a stylus according to various embodiments.

The mobile telephone, media player, and personal computer of FIGS. 20 through 22 can improve touch and hover sensing and preserve power by utilizing a stylus according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method for detecting an orientation of an input device, comprising:
    detecting a first capacitance, generated by a first electrode at a first location on the input device;
    detecting a second capacitance, generated by a second electrode at a second location on the input device;
    correlating the first and second capacitances; and
    calculating the orientation of the input device based on the correlation.

2. The method of claim 1, wherein detecting the first capacitance comprises:
    capturing an image of the first capacitance on a touch sensitive surface; and
    determining a location of the image of the first capacitance.

3. The method of claim 1, wherein detecting the second capacitance comprises:
    capturing an image of the second capacitance on a touch sensitive surface; and
    determining a location of the image of the second capacitance.

4. The method of claim 1, wherein correlating the first and second capacitances comprises:
    determining proximity of the detected first and second capacitances relative to each other in an image; and
    determining relative position of the detected first and second capacitances in the image.

5. The method of claim 1, wherein calculating the orientation of the input device comprises:
    determining the orientation based on at least one of a proximity or relative position of locations captured in an image of the detected first and second capacitances on a touch sensitive surface, wherein the closer the proximity the closer the orientation to being perpendicular with respect to the touch sensitive surface.

6. The method of claim 1, comprising:
    determining whether the input device has rotated based on the detected second capacitance.

7. The method of claim 6, wherein determining whether the device has rotated comprises:
    determining which portion of the input device forms the second capacitance; and
    determining the rotation according to the determined portion.

8. A capacitive input device comprising:
    a first electrode at a tip of the input device; and
    a second electrode proximate to the first electrode, wherein the first electrode is configured to form a first capacitance and the second electrode is configured to form a second capacitance, the first and second capacitances for detecting an orientation of the input device.

9. The device of claim 8, wherein the second electrode forms a ring around the input device at a distance from the tip.

10. The device of claim 8, wherein the second electrode comprises multiple segments.

11. The device of claim 10, wherein the segments form a broken ring around the input device at a distance from the tip.

12. The device of claim 10, wherein the segments are aligned in parallel around the input device at a distance from the tip.

13. The device of claim 8, wherein the second electrode is at the tip of the input device, the tip is flat, and the first and second electrodes are adjacent to each other, a flat surface of each of the first and second electrodes forming the flat tip.

14. The device of claim 8, comprising:
a drive circuit to output a drive voltage through the first electrode, the drive circuit comprising a clock to generate the drive voltage, a microcontroller to control the drive voltage, and at least one amplifier to adjust the drive voltage.

15. The device of claim 8, comprising:
a sense circuit to sense a voltage at the first electrode, the sense circuit comprising a sense amplifier to adjust the sensed voltage, a clock to generate a demodulation signal, a phase shifter to shift the phase of the demodulation signal, and a set of mixers to receive the sensed voltage and either the demodulation signal or the phase-shifted demodulation signal to demodulate the sensed voltage.

16. A method for detecting an orientation of a first device relative to a second device, comprising:
sensing with a first sensor in the first device an orientation of the first device relative to a reference;
sensing with a second sensor in the second device an orientation of the second device relative to the reference; and
calculating an orientation of the first device relative to the second device based on the sensed orientations of the first and second devices relative to the reference.

17. The method of claim 16, comprising:
sensing with a third sensor in the first device the orientation of the first device relative to the reference; and
comparing the sensed orientations from the first and third sensors to confirm the orientation of the first device relative to the reference.

18. The method of claim 16, comprising:
transmitting the sensed orientation of the first device to the second device.

19. The method of claim 18, wherein calculating the orientation of the first device relative to the second device comprises:
upon receipt of the transmitted sensed orientation of the first device, the second device calculating the orientation of the first device relative to the second device.

20. A system comprising:
a first device including a first sensor to detect an orientation of the first device relative to a reference and a transmitter to transmit the detected orientation of the first device; and
a second device including a second sensor to detect an orientation of the second device relative to the reference, a receiver to receive the detected orientation from the first device, and a processor to calculate an orientation of the first device relative to the second device based on the detected orientations of the first and second devices relative to the reference.

21. A capacitive input device comprising:
an electrode at a tip of an input device, the electrode configured to form a capacitance having an image shape and size indicative of an orientation of the input device; and
a second electrode of the input device, the second electrode configured to form a second capacitance having an image shape and size indicative of the orientation of the input device, wherein the second electrode is located at different locating than the electrode at the tip of the input device.

22. The device of claim 21, wherein the electrode forms the entire tip.

23. A method for detecting an orientation of an input device, comprising:
detecting a plurality of capacitances on the input device;
determining a shape and a size in an image of the detected capacitances; and
calculating the orientation of the input device based on the determination.

24. The method of claim 23, wherein calculating the orientation of the input device comprises:
calculating the orientation based on whether the shape in the image is a triangle or a circle and based on the shape size, wherein the more circular the shape the closer the orientation to being perpendicular to a surface, and wherein the smaller the size the closer the orientation to being perpendicular to the surface.

25. The method of claim 23, wherein calculating the orientation of the input device comprises:
calculating the orientation based a location of a base of a triangular image relative to an apex of the triangular image, wherein, if the base is to the right of the apex in the triangular image, the orientation is tilted to the right.

* * * * *